(12) United States Patent
Oshidari

(10) Patent No.: US 11,821,513 B2
(45) Date of Patent: Nov. 21, 2023

(54) POWER TRANSMISSION DEVICE

(71) Applicant: JATCO LTD, Fuij (JP)

(72) Inventor: Toshikazu Oshidari, Kanagawa (JP)

(73) Assignee: Jatco Ltd, Fuji (JP)

( * ) Notice: Subject to any disclaimer, the term of this patent is extended or adjusted under 35 U.S.C. 154(b) by 0 days.

(21) Appl. No.: 17/789,329

(22) PCT Filed: Dec. 7, 2020

(86) PCT No.: PCT/JP2020/045425
§ 371 (c)(1),
(2) Date: Jun. 27, 2022

(87) PCT Pub. No.: WO2021/137283
PCT Pub. Date: Jul. 8, 2021

(65) Prior Publication Data
US 2023/0045442 A1 Feb. 9, 2023

(30) Foreign Application Priority Data
Dec. 30, 2019 (JP) .................... 2019-240046

(51) Int. Cl.
F16H 63/34 (2006.01)
F16H 48/08 (2006.01)
(Continued)

(52) U.S. Cl.
CPC .... *F16H 63/3425* (2013.01); *B60K 2001/001* (2013.01); *F16H 48/08* (2013.01); *F16H 57/021* (2013.01)

(58) Field of Classification Search
CPC ................ B60K 1/00; B60K 2001/001; F16H 63/3416–3491; F16H 57/021; B60T 1/005
See application file for complete search history.

(56) References Cited

U.S. PATENT DOCUMENTS 5,637,048 A * 6/1997 Maeda .................... H02K 7/116
475/150
5,807,205 A * 9/1998 Odaka .................... F16H 63/483
477/901

(Continued)

FOREIGN PATENT DOCUMENTS

EP 3939840 A1 1/2022
JP H08-240254 A 9/1996
(Continued)

OTHER PUBLICATIONS

Extended European Search Report for the corresponding EP Application No. 20908676.8 dated May 3, 2023.

*Primary Examiner* — Ernesto A Suarez
*Assistant Examiner* — James J Taylor, II
(74) *Attorney, Agent, or Firm* — Global IP Counselors, LLP

(57) ABSTRACT

A power transmission device includes a bearing, a differential mechanism, a case that houses the differential mechanism, a pinion gear supported by the case, a wall part that overlaps the case in an axial direction, a plate that is provided between the wall part and the case in the axial direction, and that supports the case with the bearing being interposed, and a parking pawl that is rotatably fixed to the plate in a position that overlaps the plate in the axial direction.

11 Claims, 29 Drawing Sheets

(51) Int. Cl.
*B60K 1/00* (2006.01)
*F16H 57/021* (2012.01)

(56) References Cited

U.S. PATENT DOCUMENTS

| | | | |
|---|---|---|---|
| 7,980,343 B2* | 7/2011 | Mogi | H02K 7/116 |
| | | | 184/6.12 |
| 8,556,760 B2 | 10/2013 | Mack et al. | |
| 10,378,629 B2* | 8/2019 | Hiyoshi | B60T 1/005 |
| 11,428,318 B2* | 8/2022 | Ooki | B60K 17/165 |
| 2011/0011204 A1* | 1/2011 | Ueno | F16H 63/48 |
| | | | 74/606 R |
| 2013/0192400 A1* | 8/2013 | Dodo | F16H 57/0476 |
| | | | 74/421 A |
| 2019/0221348 A1 | 7/2019 | Kelly | |

FOREIGN PATENT DOCUMENTS

| | | | |
|---|---|---|---|
| JP | 2009121553 A | * | 6/2009 |
| JP | 2011-174583 A | | 9/2011 |
| JP | 2018-158619 A | | 10/2018 |
| JP | 2019-530402 A | | 10/2019 |

\* cited by examiner

POWER TRANSMISSION DEVICE

CROSS-REFERENCE TO RELATED APPLICATIONS

This is a U.S. national phase application of PCT/JP2020/045425, filed on Dec. 7, 2020, which claims priority to Japanese Patent Application No. 2019-240046, filed on Dec. 30, 2019. The entire disclosure of Japanese Patent Application No. 2019-240046 is hereby incorporated herein by reference.

TECHNICAL FIELD

The present invention relates to a power transmission device.

BACKGROUND ART

Disclosed in Japanese Laid-Open Patent Application Publication No. H08-240254 is a power transmission device for an electric automobile that has a bevel gear type differential mechanism and a planetary gear mechanism. This planetary gear mechanism comprises a stepped pinion gear having a large pinion gear and a small pinion gear.

SUMMARY

For mounting of the power transmission device in the electric automobile, there is a desire for further miniaturization.

A power transmission device according to one embodiment comprises: a bearing, a differential mechanism, a case that houses the differential mechanism, a pinion gear supported by the case, a wall part that overlaps the case in the axial direction, a plate that is provided between the wall part and the case in the axial direction, and that supports the case with the bearing interposed, and a parking pawl that is fixed to be able to rotate on the plate in a position that overlaps the plate in the axial direction.

According to certain modes of the present invention, it is possible to miniaturize the power transmission device.

DETAILED DESCRIPTION OF EMBODIMENTS

Following, an embodiment of the present invention is explained.

Figure 1:
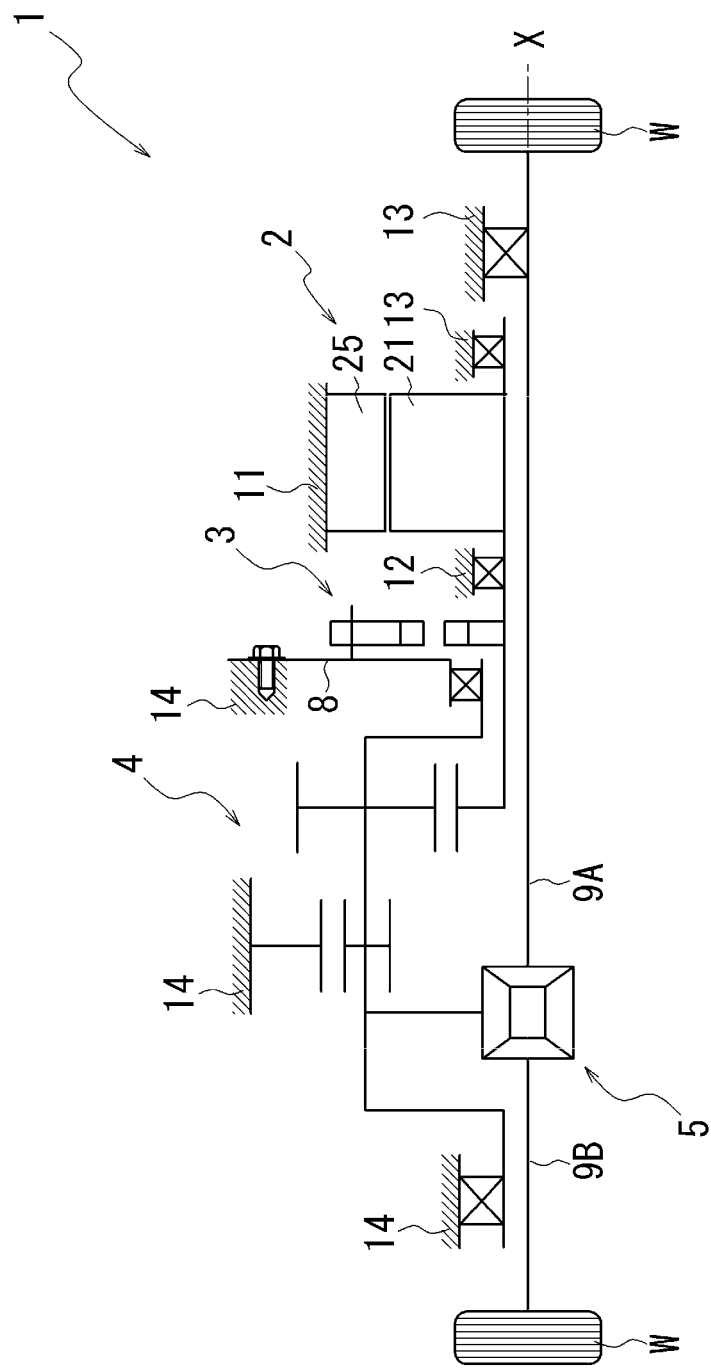
FIG. 1 is a skeleton diagram of a power transmission device.

FIG. 1 is a skeleton diagram for explaining a power transmission device 1 according to the present embodiment.

Figure 2:
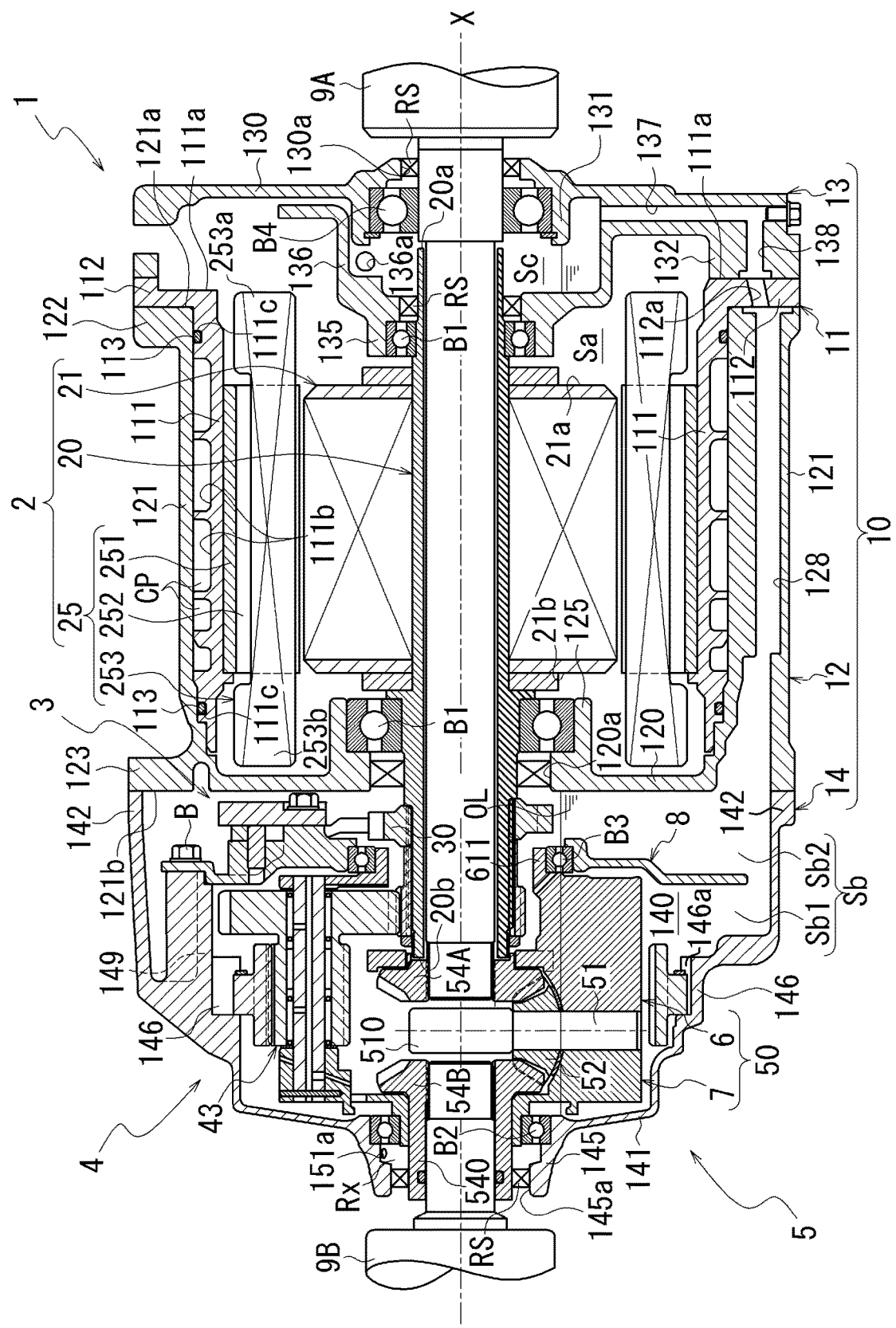
FIG. 2 is a cross section schematic diagram of the power transmission device.

FIG. 2 is a cross section schematic diagram for explaining the power transmission device 1 of the present embodiment.

Figure 3:
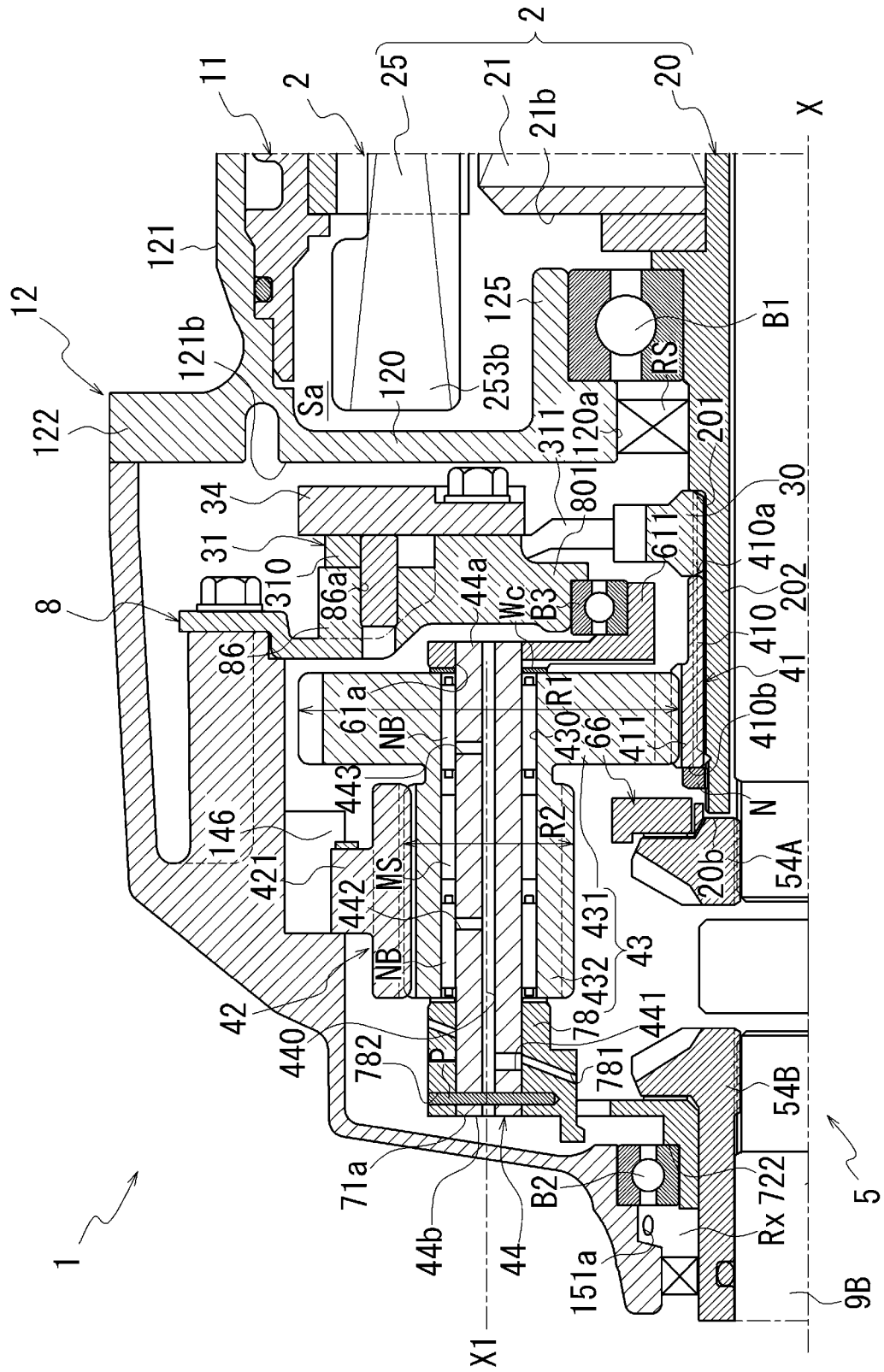
FIG. 3 is an enlarged view around a planetary reduction gear of the power transmission device.

FIG. 3 is an enlarged view around a planetary reduction gear 4 of the power transmission device 1.

Figure 4:
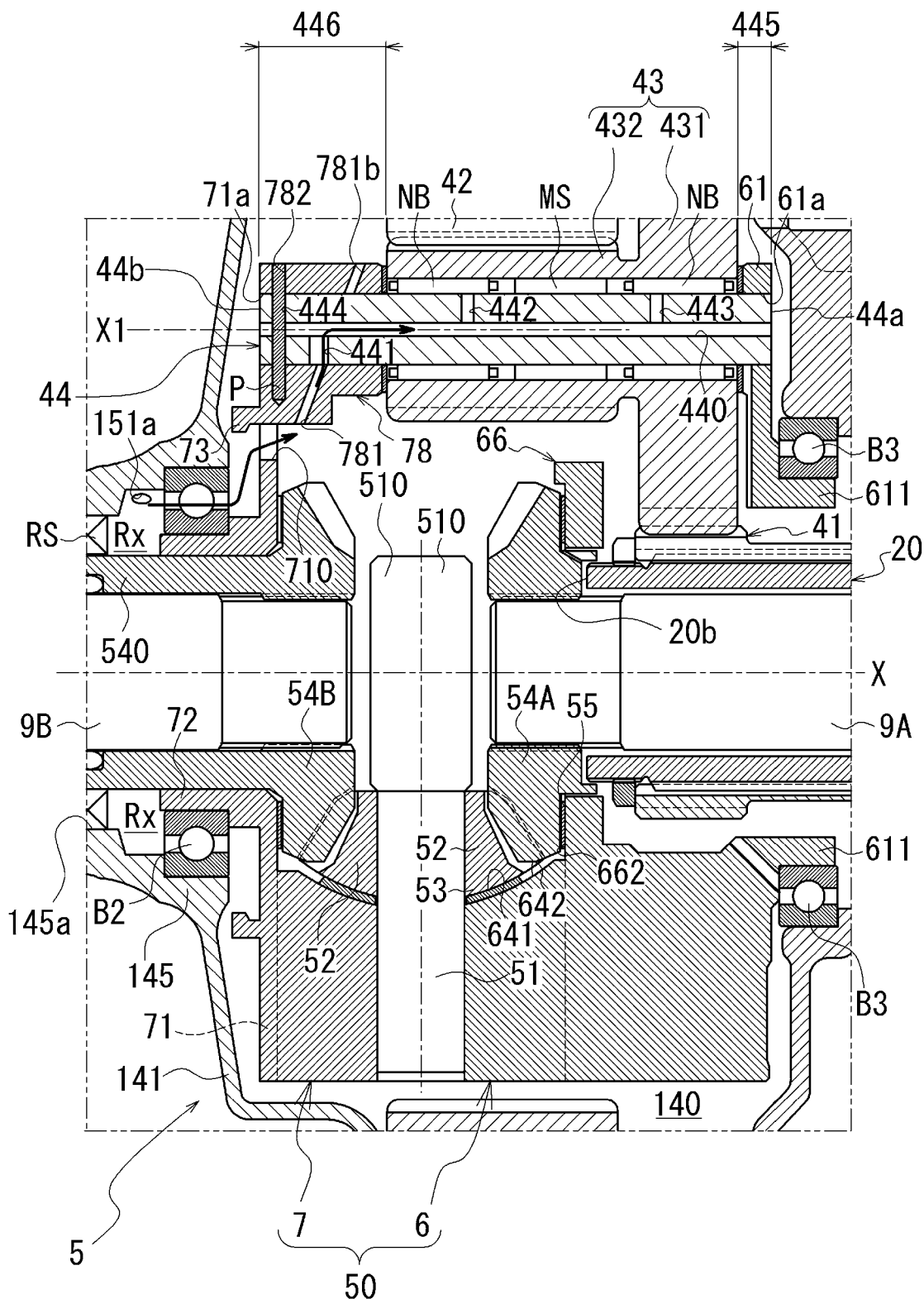
FIG. 4 is an enlarged view around a differential mechanism of the power transmission device.

FIG. 4 is an enlarged view around a differential mechanism 5 of the power transmission device 1.

As shown in FIG. 1, the power transmission device 1 has a motor 2, and the planetary reduction gear 4 (reduction mechanism) that reduces the output rotation of the motor 2 and inputs it to the differential mechanism 5. The power transmission device 1 also has drive shafts 9 (9A, 9B) as the drive shaft, and a park lock mechanism 3.

In the power transmission device 1, the park lock mechanism 3, the planetary reduction gear 4, the differential mechanism 5, and the drive shafts 9 (9A, 9B) are provided along the transmission route of the output rotation of the motor 2.

In the power transmission device 1, after being reduced by the planetary reduction gear 4 and inputted to the differential mechanism 5, the output rotation of the motor 2 is transmitted via the drive shafts 9 (9A, 9B) to left and right drive wheels W, W of a vehicle in which the power transmission device 1 is mounted.

Here, the planetary reduction gear 4 is connected downstream of the motor 2. The differential mechanism 5 is connected downstream of the planetary reduction gear 4. The drive shafts 9 (9A, 9B) are connected downstream of the differential mechanism 5.

As shown in FIG. 2, a body box 10 of the power transmission 1 has a first box 11 that houses the motor 2, and a second box 12 that is externally fitted on the first box 11. The body box 10 has a third box 13 assembled on the first box 11, and a fourth box 14 assembled on the second box 12.

The first box 11 has a cylindrical support wall part 111, and a flange shaped junction part 112 provided on one end 111a of the support wall part 111.

In the first box 11, the support wall part 111 is provided facing along the rotation axis X of the motor 2. The motor 2 is housed inside the support wall part 111.

The junction part 112 is provided facing orthogonal to the rotation axis X. The junction part 112 is formed with a larger outer diameter than the support wall part 111.

The second box 12 has a cylindrical peripheral wall part 121, a flange shaped junction part 122 provided on one end 121a of the peripheral wall part 121, and a flange shaped junction part 123 provided on another end 121b of the peripheral wall part 121.

The peripheral wall part 121 is formed with an inner diameter that can be externally fitted on the support wall part 111 of the first box 11.

The first box 11 and the second box 12 are assembled to each other by the peripheral wall part 121 of the second box 12 being externally fitted on the support wall part 111 of the first box 11.

The junction part 122 of the one end 121a side of the peripheral wall part 121 abuts the junction part 112 of the first box 11 from the rotation axis X direction. These junction parts 122, 112 are linked to each other by bolts (not illustrated).

In the first box 11, a plurality of recessed grooves 111b are provided on the outer circumference of the support wall part 111. The plurality of recessed grooves 111b are provided with a gap open in the rotation axis X direction. Each of the recessed grooves 111b is provided along the entire circumference in the circumferential direction around the rotation axis X.

The peripheral wall part 121 of the second box 12 is externally fitted on the support wall part 111 of the first box 11. The openings of the recessed grooves 111b are closed by the peripheral wall part 121. A plurality of cooling paths CP through which cooling water is circulated are formed between the support wall part 111 and the peripheral wall part 121.

At the outer circumference of the support wall part 111 of the first box 11, ring grooves 111c, 111c are formed at both sides of the region in which the recessed grooves 111b are provided. Seal rings 113, 113 are externally engaged and attached to the ring grooves 111c, 111c.

These seal rings 113 are press fitted on the inner circumference of the peripheral wall part 121 that is externally fitted on the support wall part 111, and seal the gap between the outer circumference of the support wall part 111 and the inner circumference of the peripheral wall part 121.

On the other end 121b of the second box 12, a wall part 120 extending to the inner diameter side is provided. The wall part 120 is provided facing orthogonal to the rotation axis X. An opening 120a in which the drive shaft 9A is inserted is opened in the region intersecting the rotation axis X of the wall part 120.

In the wall part 120, a cylindrical motor support unit 125 that surrounds the opening 120a is provided on the motor 2 side (right side in the drawing) surface.

The motor support unit 125 is inserted inside a coil end 253b described later. The motor support unit 125 faces an end part 21b of a rotor core 21 with a gap open in the rotation axis X direction.

In the peripheral wall part 121 of the second box 12, in the vertical line direction with the mounted state of the power transmission device 1 in the vehicle as reference, the thickness in the radial direction of the lower region is thicker than the upper region.

In this region that is thick in the radial direction, an oil reservoir 128 is provided penetrating in the rotation axis X direction.

The oil reservoir 128 is connected via a communication hole 112a to an axial oil passage 138 provided in a junction part 132 of the third box 13. The communication hole 112a is provided in the junction part 112 of the first box 11.

The third box 13 has a wall part 130 that is orthogonal to the rotation axis X. A junction part 132 that forms a ring shape seen from the rotation axis X direction is provided on the outer circumference part of the wall part 130.

Seen from the first box 11, the third box 13 is positioned on the opposite side (right side in the drawing) from the differential mechanism 5. The junction part 132 of the third box 13 is joined to the junction part 112 of the first box 11 from the rotation axis X direction. The third box 13 and the first box 11 are linked to each other by bolts (not illustrated). In this state, in the first box 11, the opening on the junction part 122 side (right side in the drawing) of the support wall part 111 is blocked by the third box 13.

In the third box 13, an insertion hole 130a of the drive shaft 9A is provided in the center of the wall part 130.

A lip seal RS is provided on the inner circumference of the insertion hole 130a. In the lip seal RS, a lip section (not illustrated) is in elastic contact with the outer circumference of the drive shaft 9A. The gap between the inner circumference of the insertion hole 130a and the outer circumference of the drive shaft 9A is sealed by the lip seal RS.

A peripheral wall part 131 that surrounds the insertion hole 130a is provided on the surface of the first box 11 side (left side in the drawing) in the wall part 130. The drive shaft 9A is supported with a bearing B4 interposed on the inner circumference of the peripheral wall part 131.

Seen from the peripheral wall part 131, a motor support unit 135 is provided on the motor 2 side (left side in the drawing). The motor support unit 135 forms a tube shape that surrounds the outer circumference of the rotation axis X with a gap open.

A cylindrical connecting wall 136 is connected to the outer circumference of the motor support unit 135. The connecting wall 136 is formed with a larger outer diameter than the peripheral wall part 131 of the wall part 130 side (right side in the drawing). The connecting wall 136 is provided facing along the rotation axis X, and extends in the direction separating from the motor 2. The connecting wall 136 connects the motor support unit 135 and the wall part 130 of the third box 13.

The motor support unit 135 is supported by the third box 13 with the connecting wall 136 interposed. One end 20a side of a motor shaft 20 penetrates the inside of the motor support unit 135 from the motor 2 side to the peripheral wall part 131 side.

A bearing B1 is supported on the inner circumference of the motor support unit 135. The outer circumference of the motor shaft 20 is supported by the motor support unit 135 with the bearing B1 interposed.

The lip seal RS is provided on the position adjacent to the bearing B1.

In the third box 13, an oil hole 136a described later is open at the inner circumference of the connecting wall 136. Oil OL from the oil hole 136a is made to flow into a space (internal space Sc) surrounded by the connecting wall 136. The lip seal RS is provided to prevent the inflow of oil OL inside the connecting wall 136 to the motor 2 side.

The fourth box 14 has a peripheral wall part 141 that surrounds the outer circumference of the planetary reduction gear 4 and the differential mechanism 5, and a flange shaped junction part 142 provided on the end part of the second box 12 side in the peripheral wall part 141.

The fourth box 14 is positioned at the differential mechanism 5 side (left side in the drawing) seen from the second box 12. The junction part 142 of the fourth box 14 is joined from the rotation axis X direction to the junction part 123 of the second box 12. The fourth box 14 and the second box 12 are linked to each other by bolts (not illustrated).

Inside the body box 10 of the power transmission device 1, a motor chamber Sa that houses the motor 2 and a gear chamber Sb that houses the planetary reduction gear 4 and the differential mechanism 5 are formed.

The motor chamber Sa is formed between the wall part 120 of the second box 12 and the wall part 130 of the third box 13 on the inside of the first box 11.

The gear chamber Sb is formed between the wall part 120 of the second box 12 and the peripheral wall part 141 of the fourth box 14 on the inner diameter side of the fourth box 14.

A plate member 8 is provided on the inside of the gear chamber Sb.

The plate member 8 is fixed by the bolt B to the fourth box 14 which is a fixing member.

In the plate member 8, the gear chamber Sb is partitioned into a first gear chamber Sb1 that houses the planetary reduction gear 4 and the differential mechanism 5, and a second gear chamber Sb2 that houses the park lock mechanism 3.

The second gear chamber Sb2 is positioned between the first gear chamber Sb1 and the motor chamber Sa in the rotation axis X direction.

The motor 2 has the cylindrical motor shaft 20, the cylindrical rotor core 21 externally fitted on the motor shaft 20, and a stator core 25 that surrounds the outer circumference of the rotor core 21 with a gap open.

In the motor shaft 20, bearings B1, B1 are externally fitted and fixed at both sides of the rotor core 21.

The bearing B1 positioned at one end 20a side (right side in the drawing) of the motor shaft 20 seen from the rotor core 21 is supported on the inner circumference of the motor support unit 135 of the third box 13. The bearing B1 positioned at the other end 20b side is supported on the inner circumference of the cylindrical motor support unit 125 of the second box 12.

The motor support units 135, 125 are arranged facing with a gap open in the rotation axis X direction on the one end part 21a and the other end part 21b of the rotor core 21 on the inner diameter side of coil ends 253a, 253b described later.

The rotor core 21 is formed by laminating a plurality of silicon steel sheets, and each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape. At the outer circumference side of the silicon steel sheet, N pole and S pole magnets (not illustrated) are provided alternately in the circumferential direction around the rotation axis X.

The stator core 25 surrounding the outer circumference of the rotor core 21 is formed by laminating a plurality of electromagnetic steel sheets. The stator core 25 is fixed to the inner circumference of the cylindrical support wall part 111 of the first box 11.

Each of the electromagnetic steel sheets has a ring-shaped yoke part 251 fixed to the inner circumference of the support wall part 111, and a teeth part 252 projecting to the rotor core 21 side from the inner circumference of the yoke part 251.

With the present embodiment, the stator core 25 having a configuration in which a winding 253 is distributed and wound across a plurality of teeth parts 252 is adopted. The stator core 25 has a longer length in the rotation axis X direction than the rotor core 21 by the amount of the coil ends 253a, 253b projecting in the rotation axis X direction.

It is also possible to adopt the stator core of a configuration in which the windings are concentrically wound on each of the plurality of teeth parts 252 projecting to the rotor core 21 side.

The opening 120a is provided in the wall part 120 (motor support unit 125) of the second box 12. The other end 20b side of the motor shaft 20 is positioned inside the fourth box 14, penetrating the opening 120a at the differential mechanism 5 side (left side in the drawing).

The other end 20b of the motor shaft 20 faces a side gear 54A described later with a gap open in the rotation axis X direction on the inside of the fourth box 14.

As shown in FIG. 3, in the motor shaft 20, a step 201 is provided in a region positioned inside the fourth box 14. The step 201 is positioned in the vicinity of the motor support unit 125. The lip seal RS supported on the inner circumference of the motor support unit 125 is abutting the outer circumference of the region between the step 201 and the bearing B1.

The lip seal RS is partitioned into the motor chamber Sa that houses the motor 2 and the gear chamber Sb inside the fourth box 14.

The oil OL for lubricating the planetary reduction gear 4 and the differential mechanism 5 is sealed at the inner diameter side of the fourth box 14 (see FIG. 2).

The lip seal RS is provided to prevent inflow of the oil OL to the motor chamber Sa.

As shown in FIG. 3, in the motor shaft 20, the region from the step 201 to the vicinity of the other end 20b is a fitted part 202 with a spline provided on the outer circumference.

The parking gear 30 and a sun gear 41 are spline fitted on the outer circumference of the fitted part 202.

In the parking gear 30, one side surface of the parking gear 30 in the rotation axis X direction abuts the step 201 (right side in the drawing). One end 410a of a cylindrical base 410 of the sun gear 41 abuts the other side surface of the parking gear 30 (left side in the drawing).

A nut N screwed onto the other end 20b of the motor shaft 20 is press fitted from the rotation axis X direction on the other end 410b of the base 410.

The sun gear 41 and the parking gear 30 are provided in a state sandwiched between the nut N and the step 201, without being able to rotate relatively to the motor shaft 20.

The sun gear 41 has teeth 411 on the outer circumference of the other end 20b side of the motor shaft 20. A large diameter gear part 431 of a stepped pinion gear 43 engages with the outer circumference of the teeth 411.

The stepped pinion gear 43 has the large diameter gear part 431 that engages with the sun gear 41, and a small diameter gear part 432 with a smaller diameter than the large diameter gear part 431.

The stepped pinion gear 43 is a gear component in which the large diameter gear part 431 and the small diameter gear part 432 are provided integrally aligned in an axis line X1 direction parallel to the rotation axis X.

The large diameter gear part 431 is formed with an outer diameter R1 greater than an outer diameter R2 of the small diameter gear part 432.

The stepped pinion gear 43 is provided facing along the axis line X1. In this state, the large diameter gear part 431 is positioned at the motor 2 side (right side in the drawing).

The outer circumference of the small diameter gear part 432 is engaged with the inner circumference of a ring gear 42. The ring gear 42 forms a ring shape that surrounds the rotation axis X with a gap open. A plurality of engagement teeth 421 projecting radially outward are provided on the outer circumference of the ring gear 42. The plurality of engagement teeth 421 are provided at intervals in the circumferential direction around the rotation axis X.

In the ring gear 42, the engagement teeth 421 provided on the outer circumference are spline fitted to teeth 146a provided on a support wall part 146 of the fourth box 14. In the ring gear 42, rotation around the rotation axis X is regulated.

The stepped pinion gear 43 has a through hole 430 penetrating the inner diameter side of the large diameter gear part 431 and the small diameter gear part 432 in the axis line X1 direction.

The stepped pinion gear 43 is supported to be able to rotate on the outer circumference of a pinion shaft 44 penetrating the through hole 430 with the needle bearings NB, NB interposed.

On the outer circumference of the pinion shaft 44, a middle spacer MS is interposed between the needle bearing NB that supports the inner circumference of the large diameter gear part 431 and the needle bearing NB that supports the inner circumference of the small diameter gear part 432.

As shown in FIG. 4, a shaft-internal oil passage 440 is provided on the inside of the pinion shaft 44. The shaft-internal oil passage 440 penetrates from one end 44a of the pinion shaft 44 to another end 44b along the axis line X1.

Oil holes 442, 443 that communicate between the shaft-internal oil passage 440 and the outer circumference of the pinion shaft 44 are provided on the pinion shaft 44.

The oil hole 443 opens in the region in which the needle bearing NB that supports the inner circumference of the large diameter gear part 431 is provided.

The oil hole 442 opens in the region in which the needle bearing NB that supports the inner circumference of the small diameter gear part 432 is provided.

In the pinion shaft 44, the oil holes 443, 442 open inside the region in which the stepped pinion gear 43 is externally fitted.

Furthermore, an introduction path 441 for introducing the oil OL into the shaft-internal oil passage 440 is provided in the pinion shaft 44.

In the outer circumference of the pinion shaft 44, the introduction path 441 opens in the region positioned inside a support hole 71a of a second case unit 7 described later.

The introduction path 441 communicates between the shaft-internal oil passage 440 and the outer circumference of the pinion shaft 44.

A case-internal oil passage 781 is opened on the inner circumference of the support hole 71a. The case-internal oil passage 781 communicates between the outer circumference of a guide unit 78 projecting from a base 71 of the second case unit 7 and the support hole 71a.

In the cross section view along the axis line X1, the case-internal oil passage 781 is inclined with respect to the axis line X1. The case-internal oil passage 781 is inclined facing toward a slit 710 provided in the base 71 as it faces the rotation axis X side.

The oil OL scooped up by a differential case 50 described later flows into the case-internal oil passage 781. The oil OL that moves to the outer diameter side by centrifugal force due to rotation of the differential case 50 also flows into the case-internal oil passage 781.

The oil OL that flows into the introduction path 441 from the case-internal oil passage 781 flows into the shaft-internal oil passage 440 of the pinion shaft 44. The oil OL that flows into the shaft-internal oil passage 440 is discharged radially outward from the oil holes 442, 443. The oil OL discharged from the oil holes 442, 443 lubricates the needle bearing NB externally fitted on the pinion shaft 44.

In the pinion shaft 44, a through hole 444 is provided more to the other end 44b side than the region in which the introduction path 441 is provided. The through hole 444 penetrates the pinion shaft 44 in the diameter line direction.

The pinion shaft 44 is provided so that the through hole 444 and an insertion hole 782 of the second case unit 7 described later are in phase around the axis line X1. A positioning pin P inserted in the insertion hole 782 penetrates the through hole 444 of the pinion shaft 44. As a result, the pinion shaft 44 is supported on the second case unit 7 side in a state with rotation around the axis line X1 regulated.

As shown in FIG. 4, on the one end 44a side in the lengthwise direction of the pinion shaft 44, a region projecting from the stepped pinion gear 43 is a first shaft part 445. The first shaft part 445 is supported by a support hole 61a provided in a first case unit 6 of the differential case 50.

At the other end 44b side in the lengthwise direction of the pinion shaft 44, the region projecting from the stepped pinion gear 43 is a second shaft part 446. The second shaft part 446 is supported by the support hole 71a provided in the second case unit 7 of the differential case 50.

Here, the first shaft part 445 means a region of the one end 44a side in which the stepped pinion gear 43 is not externally fitted in the pinion shaft 44. The second shaft part 446 means a region of the other end 44b side in which the stepped pinion gear 43 is not externally fitted in the pinion shaft 44.

In the pinion shaft 44, the length of the axis line X1 direction is longer for the second shaft part 446 than the first shaft part 445.

Following, the main configuration of the differential mechanism 5 is explained.

Figure 5:
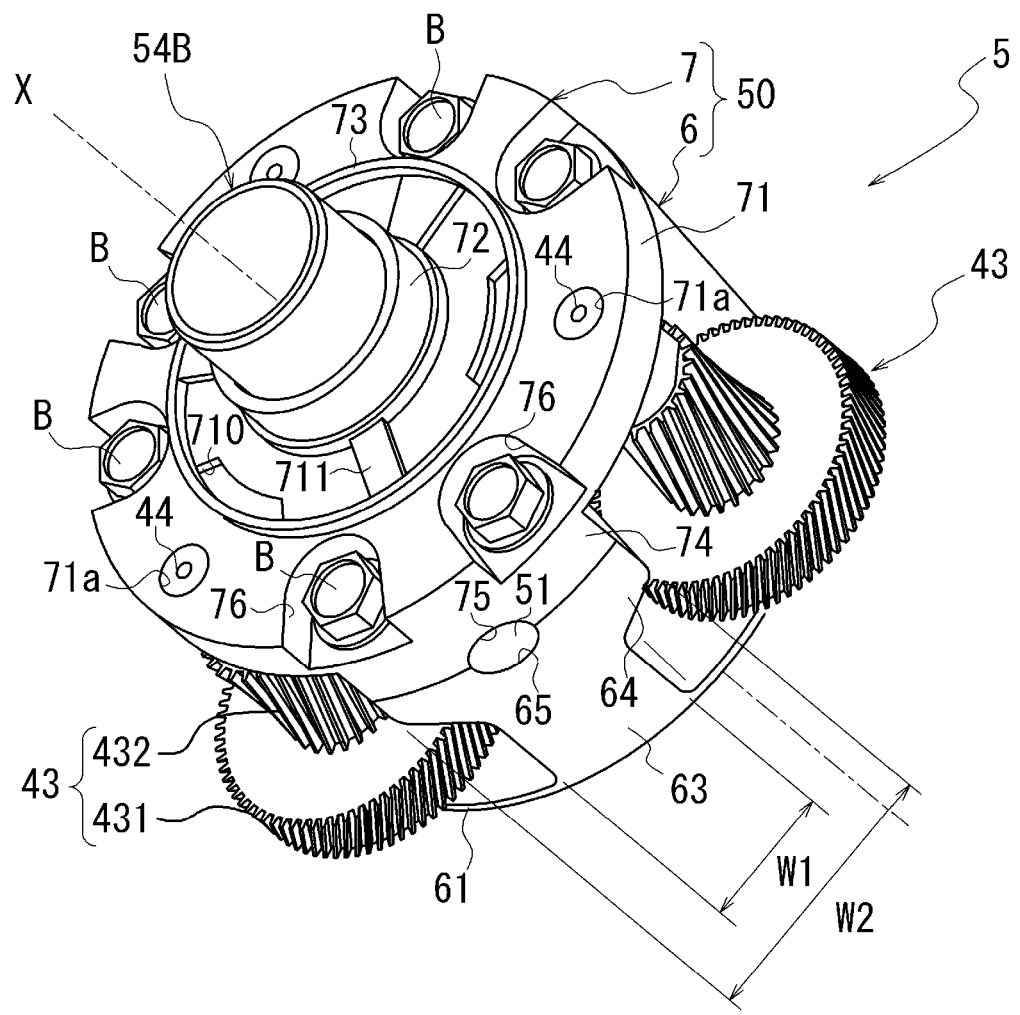
FIG. 5 is a perspective view of the differential mechanism of the power transmission device.

FIG. 5 is a perspective view around the differential case 50 of the differential mechanism 5.

Figure 6:
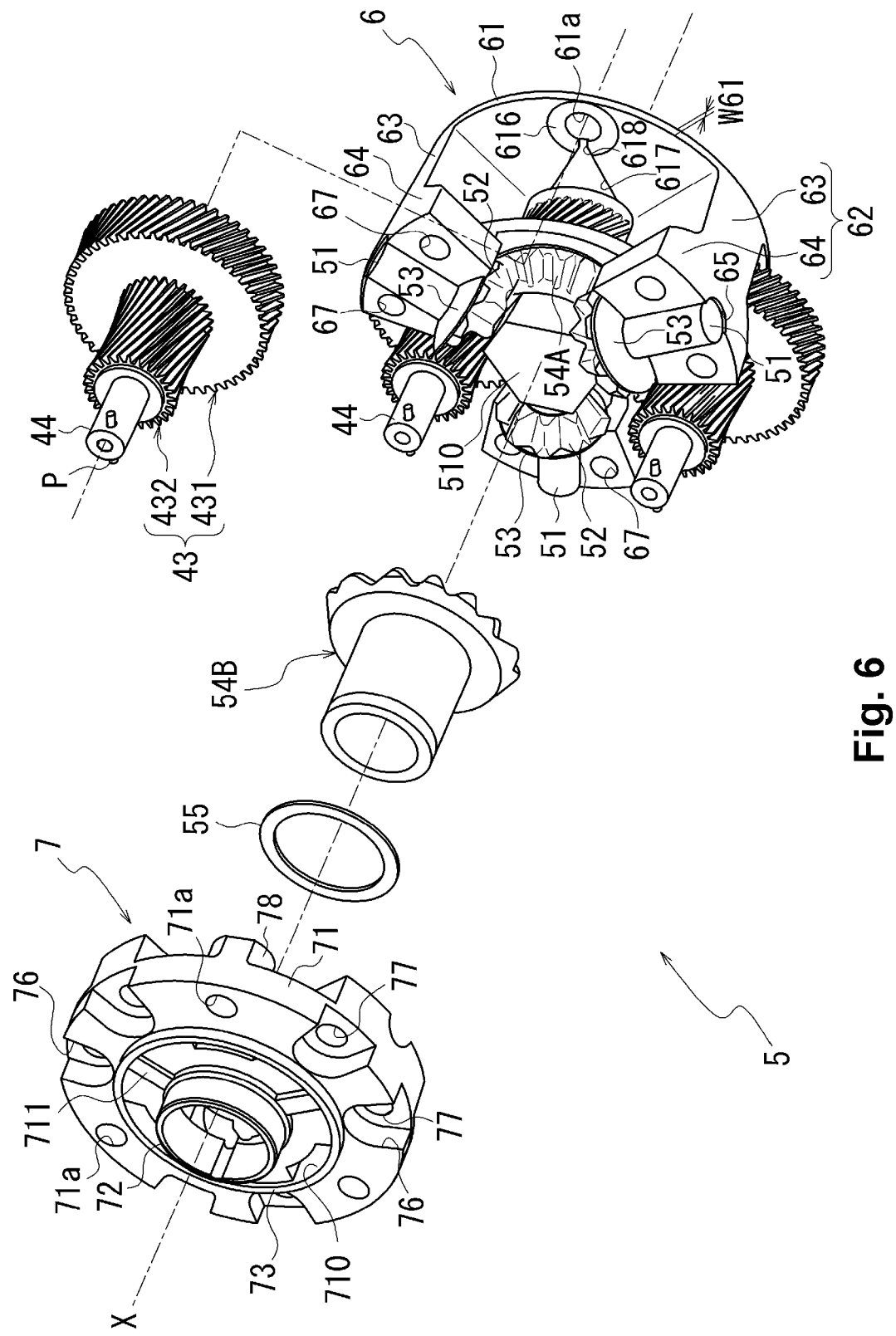
FIG. 6 is an exploded perspective view of the differential mechanism of the power transmission device.

FIG. 6 is an exploded perspective view around the differential case 50 of the differential mechanism 5.

As shown in FIG. 4 to FIG. 6, the differential case 50 as a case houses the differential mechanism 5. The differential case 50 is formed by assembling the first case unit 6 and the second case unit 7 in the rotation axis X direction. In the differential case 50 of the present embodiment, the first case unit 6 and the second case unit 7 have a function as carriers that support the pinion shaft 44 of the planetary reduction gear 4.

As shown in FIG. 6, three pinion mate gears 52 and three pinion mate shafts 51 are provided between the first case unit 6 and the second case unit 7 of the differential case 50. The pinion mate shafts 51 are provided at equal intervals in the circumferential direction around the rotation axis X (see FIG. 6).

The end part of the inner diameter side of each pinion mate shaft 51 is linked to a common linking part 510.

One pinion mate gear 52 each is externally fitted on the pinion mate shafts 51. Each pinion mate gear 52 is in contact with the linking part 510 from the radial outward side of the rotation axis X.

Each of the pinion mate gears 52 in this state is supported to be rotatable on the pinion mate shaft 51.

As shown in FIG. 4, a spherical washer 53 is externally fitted on the pinion mate shaft 51. The spherical washer 53 is in contact with the spherical outer circumference of the pinion mate gear 52.

In the differential case 50, the side gear 54A is positioned at one side of the linking part 510 in the rotation axis X direction, and a side gear 54B is positioned at the other side. The side gear 54A is supported to be rotatable on the first case unit 6. The side gear 54B is supported to be rotatable on the second case unit 7.

The side gear 54A is engaged to the three pinion mate gears 52 from one side in the rotation axis X direction. The side gear 54B engages with the three pinion mate gears 52 from the other side in the rotation axis X direction.

From FIG. 7 to FIG. 10 are drawings for explaining the first case unit 6.

Figure 7:
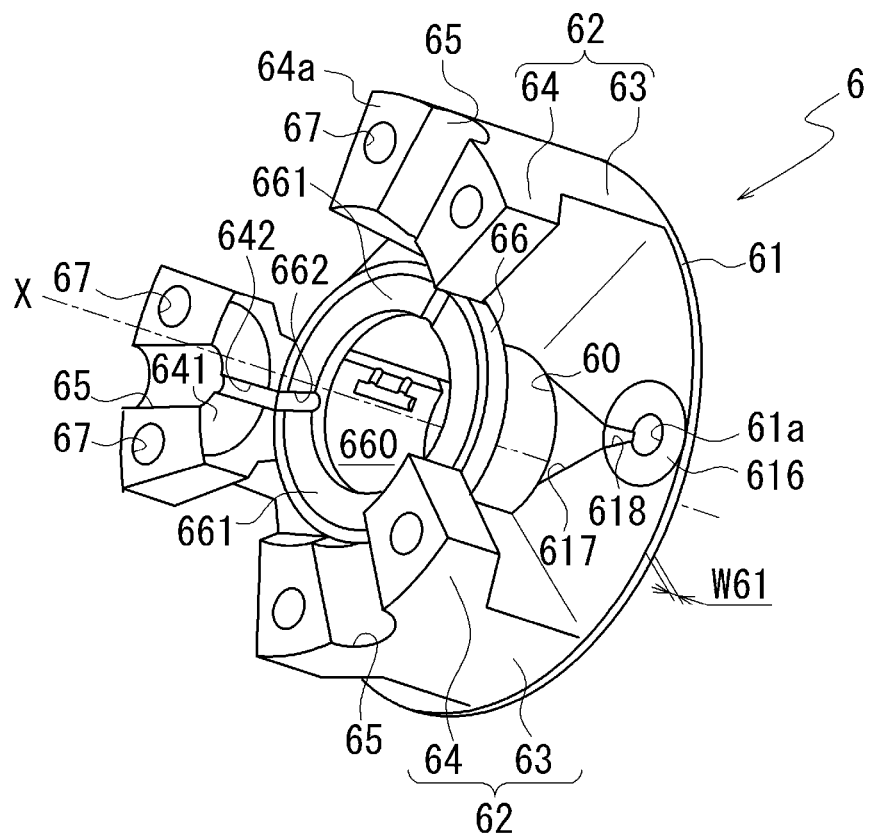
FIG. 7 is a drawing for explaining a first case unit of the differential mechanism.

FIG. 7 is a perspective view of the first case unit 6 seen from the second case unit 7 side.

Figure 8:
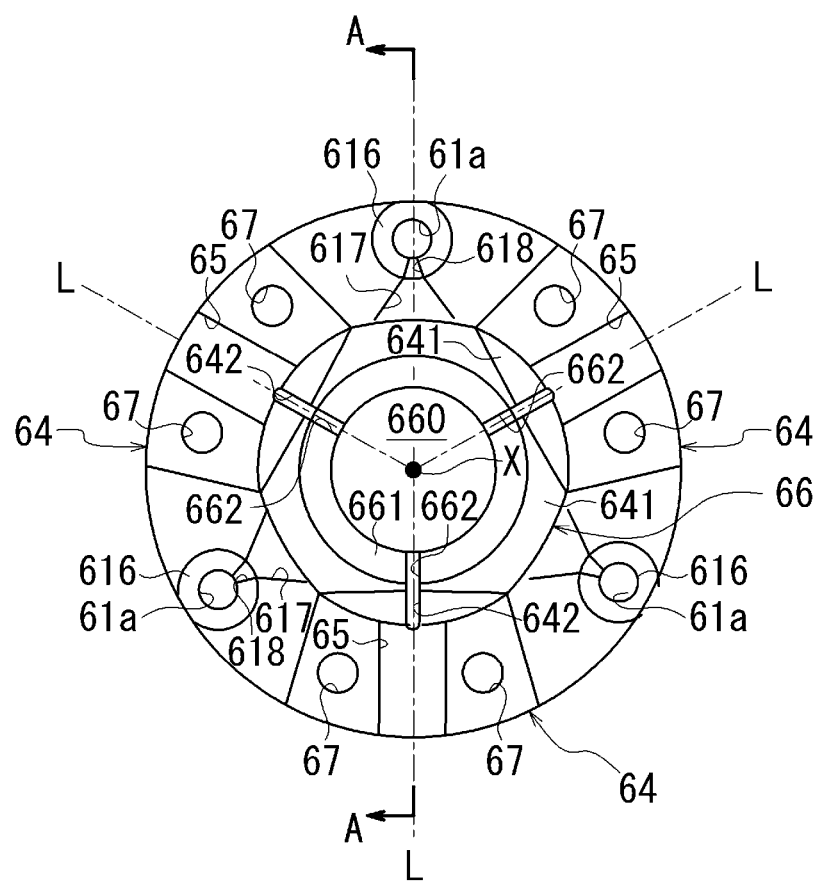
FIG. 8 is a drawing for explaining the first case unit of the differential mechanism.

FIG. 8 is a plan view of the first case unit 6 seen from the second case unit 7 side.

Figure 9:
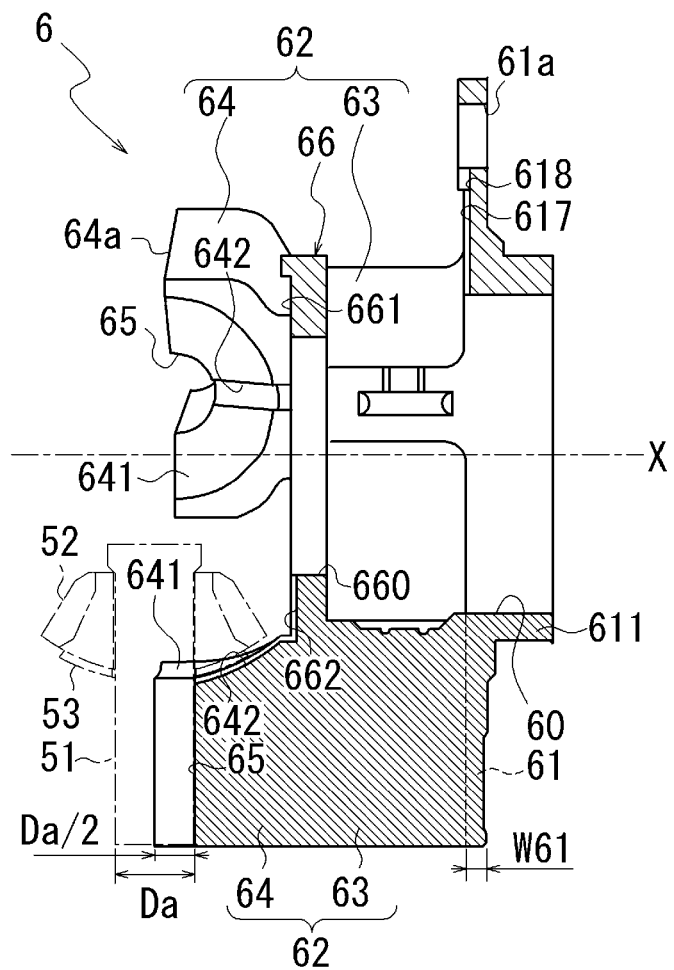
FIG. 9 is a drawing for explaining the first case unit of the differential mechanism.

FIG. 9 is a schematic diagram of the A-A cross section in FIG. 8. FIG. 9 shows the arrangement of the pinion mate shaft 51 and the pinion mate gear 52 using virtual lines.

Figure 10:
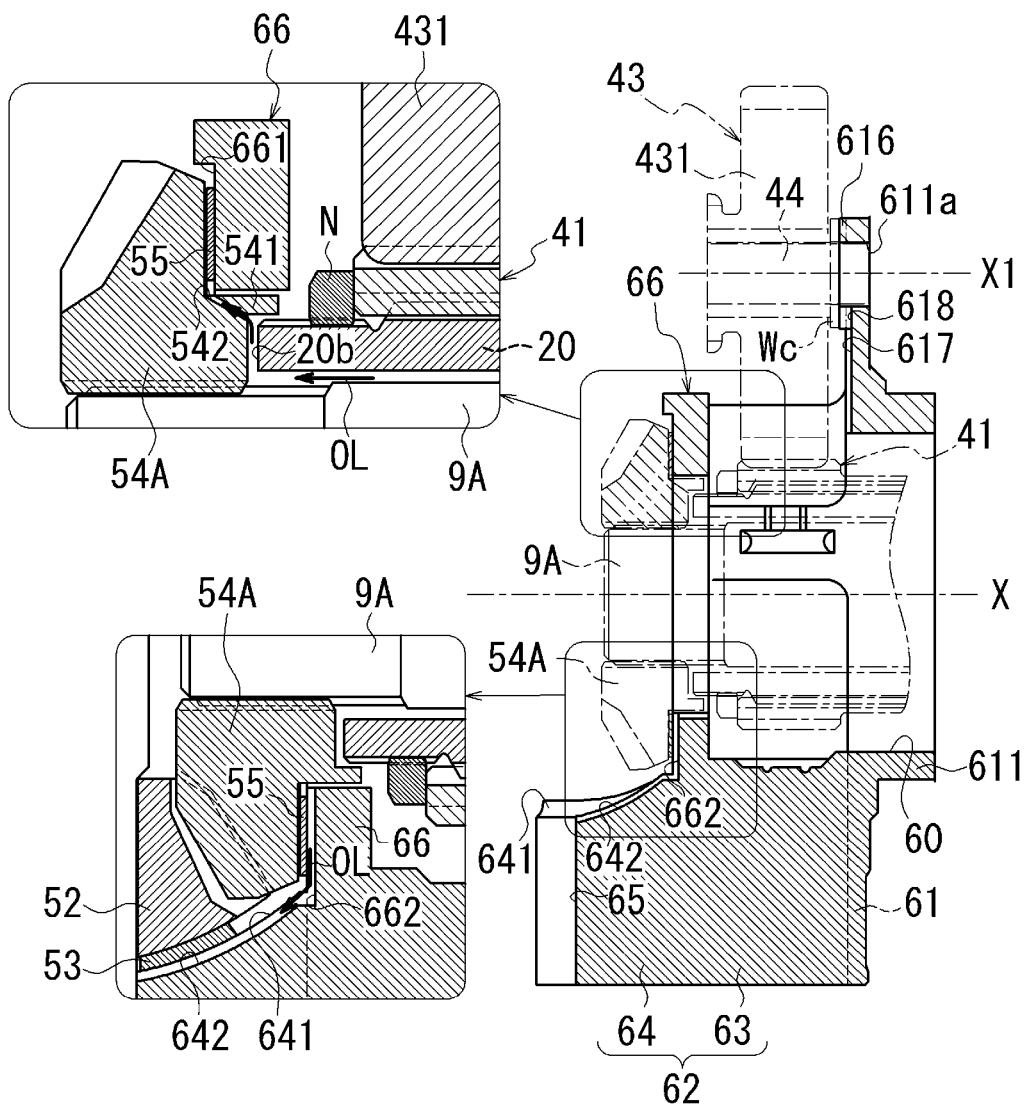
FIG. 10 is a drawing for explaining the first case unit of the differential mechanism.

FIG. 10 is a schematic diagram of the A-A cross section in FIG. 8. FIG. 10 shows the arrangement of the side gear 54A, the stepped pinion gear 43, and the drive shaft 9A using virtual lines while omitting an illustration of a linking beam 62 of the paper surface back side.

As shown in FIG. 7 and FIG. 8, the first case unit 6 has a ring-shaped base 61. The base 61 is a plate-shaped member having a thickness W61 in the rotation axis X direction.

As shown in FIG. 9 and FIG. 10, an opening 60 is provided in the center of the base 61. A cylinder wall part 611 that surrounds the opening 60 is provided on the surface on the side opposite to the second case unit 7 (right side in the drawing) in the base 61. The outer circumference of the cylinder wall part 611 is supported by the plate member 8 with a bearing B3 interposed (see FIG. 2). The rotation axis of the bearing B3 is coaxial with the rotation axis X.

Three linking beams 62 extending to the second case unit 7 side are provided on the surface of the second case unit 7 side (left side in the drawing) in the base 61.

The linking beams 62 are provided at equal intervals in the circumferential direction around the rotation axis X (see FIG. 7 and FIG. 8).

The linking beams 62 have a base 63 orthogonal to the base 61 and a linking part 64 that is wider than the base 63.

As shown in FIG. 9, a tip surface 64a of the linking part 64 is a flat surface orthogonal to the rotation axis X, and a support groove 65 for supporting the pinion mate shaft 51 is provided on the tip surface 64a.

As shown in FIG. 8, the support groove 65 seen from the rotation axis X direction is formed in a straight line along a radius line L of the ring-shaped base 61. The support groove 65 crosses the center of the linking part 64 from the inner diameter side to the outer diameter side in the circumferential direction around the rotation axis X.

As shown in FIG. 9 and FIG. 10, the support groove 65 forms a semicircle shape along the outer diameter of the pinion mate shaft 51. The support groove 65 is formed at a depth that can house half of the cylindrical pinion mate shaft 51. Specifically, the support groove 65 is formed at a depth corresponding to half the diameter Da of the pinion mate shaft 51 (=Da/2).

An arc part 641 is formed in a shape along the outer circumference of the pinion mate gear 52 on the inner diameter side (rotation axis X side) of the linking part 64.

In the arc part 641, the outer circumference of the pinion mate gear 52 is supported with the spherical washer 53 interposed.

In the arc part 641, an oil groove 642 is provided facing along the radius line L noted above. The oil groove 642 is provided in a range from the support groove 65 of the pinion mate shaft 51 to a gear support part 66 fixed to the inner circumference of the linking part 64.

The gear support part 66 is connected to the boundary of the base 63 and the linking part 64. The gear support part 66 is provided facing orthogonal to the rotation axis X. The gear support part 66 has a through hole 660 at the center.

As shown in FIG. 8, the outer circumference of the gear support part 66 is connected to the inner circumference of the three linking parts 64. In this state, the center of the through hole 660 is positioned on the rotation axis X.

As shown in FIG. 9 and FIG. 10, in the gear support part 66, a recess 661 surrounding the through hole 660 is provided on the surface of the side opposite to the base 61 (left side in the drawing). In the recess 661, a ring-shaped washer 55 that supports the back surface of the side gear 54A is housed.

A cylindrical cylinder wall part 541 is provided on the back surface of the side gear 54A. The washer 55 is externally fitted on the cylinder wall part 541.

Seen from the rotation axis X direction, three oil grooves 662 are provided on the surface of the recess 661 side in the gear support part 66. The oil grooves 662 are provided at intervals in the circumferential direction around the rotation axis X.

The oil groove 662 extends from the inner circumference of the gear support part 66 to the outer circumference along the radius line L noted above. The oil groove 662 is in contact with the oil groove 642 on the arc part 641 side noted above.

As shown in FIG. 7 and FIG. 8, the support holes 61a of the pinion shaft 44 are open on the base 61. The support holes 61a are open at the region between the linking beams 62, 62 arranged at prescribed intervals in the circumferential direction around the rotation axis X.

A boss part 616 surrounding the support hole 61a is provided on the base 61. A washer We (see FIG. 10) externally fitted on the pinion shaft 44 is in contact with the boss part 616 from the rotation axis X direction.

In the base 61, an oil groove 617 is provided in the range from the center opening 60 to the boss part 616.

As shown in FIG. 8, the oil groove 617 is formed in a tapered shape in which the circumferential direction width around the rotation axis X becomes narrower as it approaches the boss part 616. The oil groove 617 is connected to an oil groove 618 provided on the boss part 616.

In the linking part 64, bolt holes 67, 67 are provided at both sides of the support groove 65.

A linking part 74 of the second case unit 7 side is joined from the rotation axis X direction to the linking part 64 of the first case unit 6. The first case unit 6 and the second case unit 7 are joined to each other by the bolts B that penetrate the linking part of the second case unit 7 side being screwed into bolt holes 67, 67.

FIG. 11 to FIG. 16 are drawings for explaining the second case unit 7.

Figure 11:
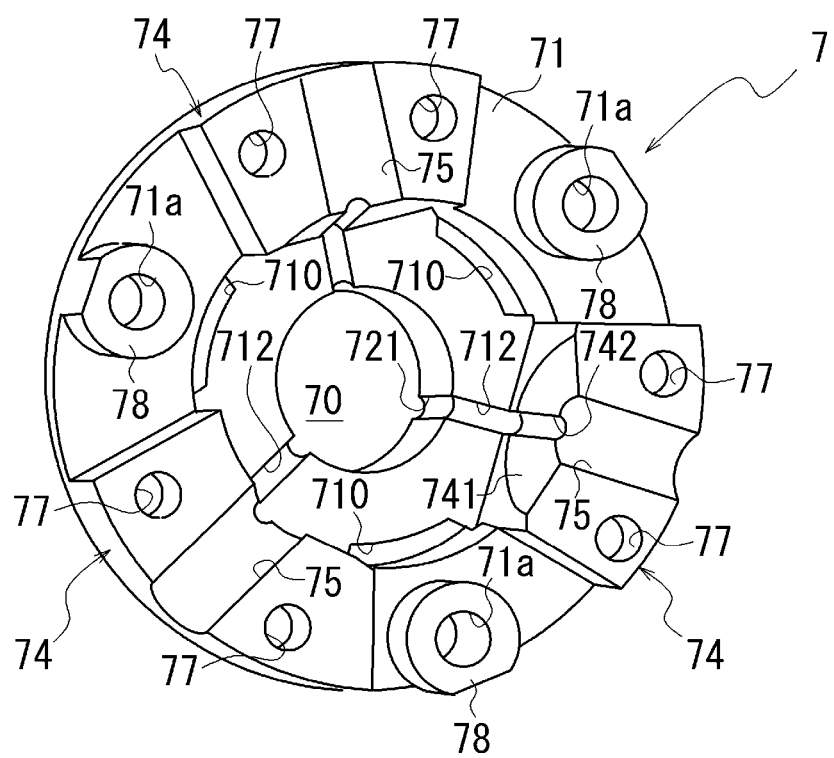
FIG. 11 is a drawing for explaining a second case unit of the differential mechanism.

FIG. 11 is a perspective view of the second case unit 7 seen from the first case unit 6 side.

Figure 12:
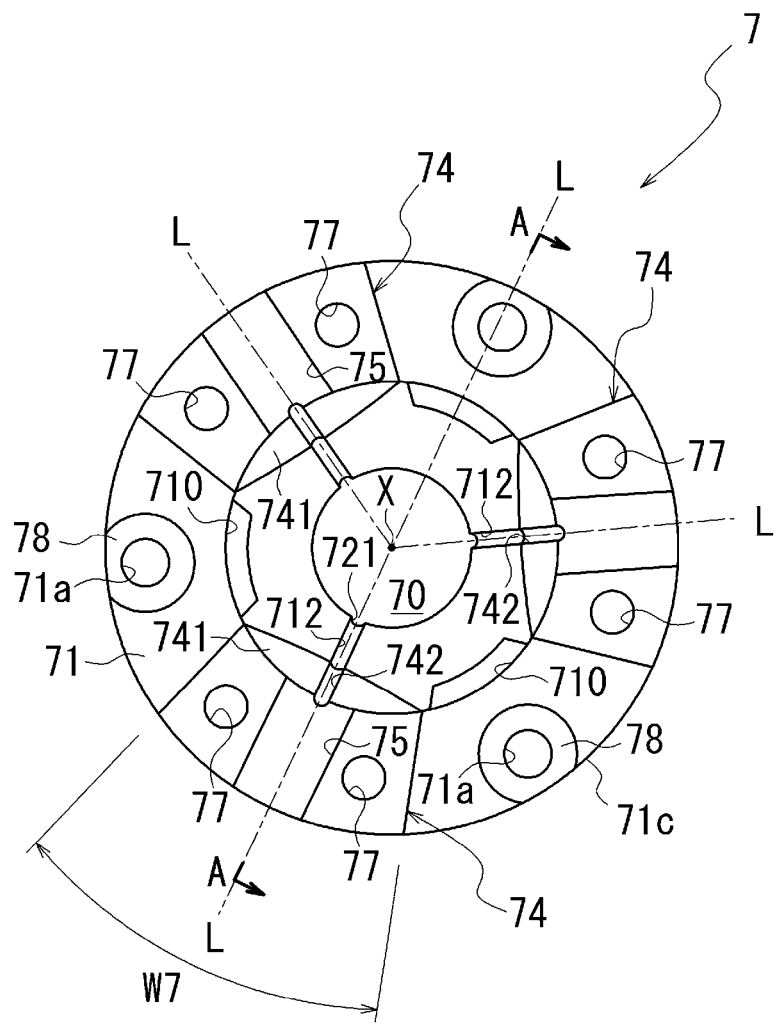
FIG. 12 is a drawing for explaining the second case unit of the differential mechanism.

FIG. 12 is a plan view of the second case unit 7 seen from the first case unit 6 side.

Figure 13:
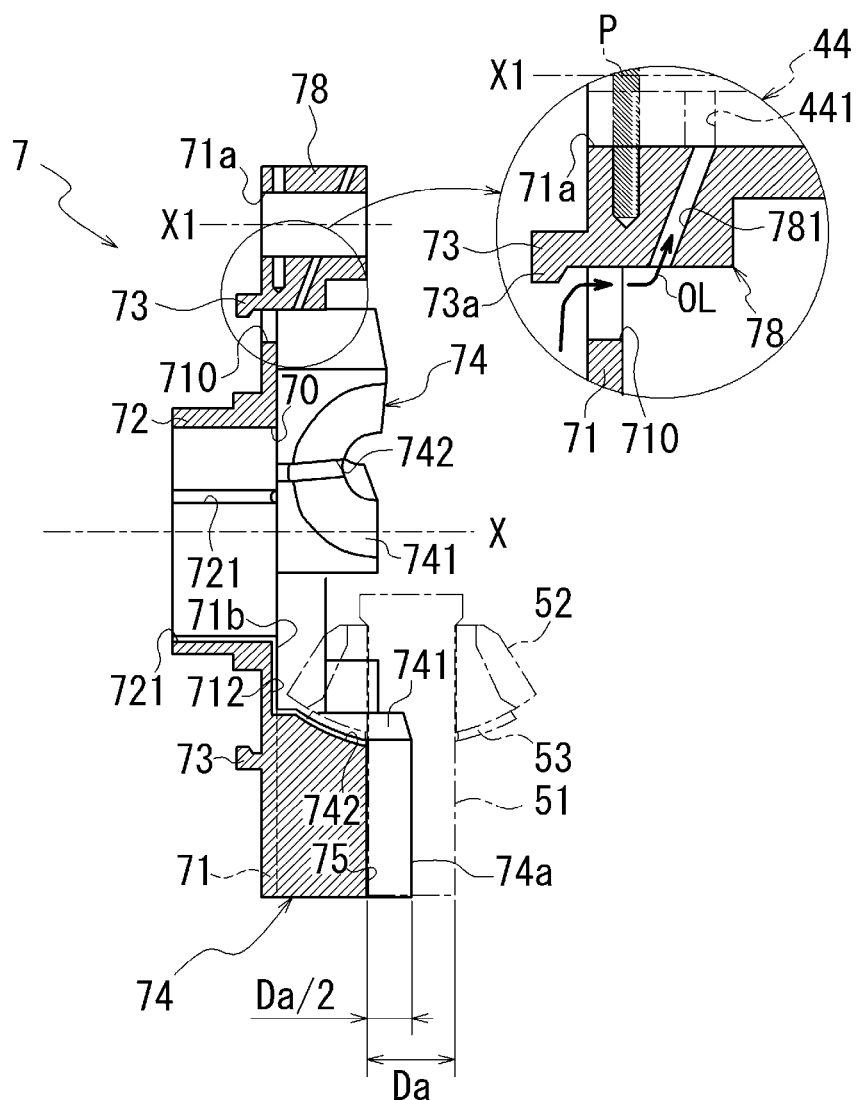
FIG. 13 is a drawing for explaining the second case unit of the differential mechanism.

FIG. 13 is a schematic diagram of the A-A cross section in FIG. 12. FIG. 13 shows the arrangement of the pinion mate shaft 51 and the pinion mate gear 52 using virtual lines.

Figure 14:
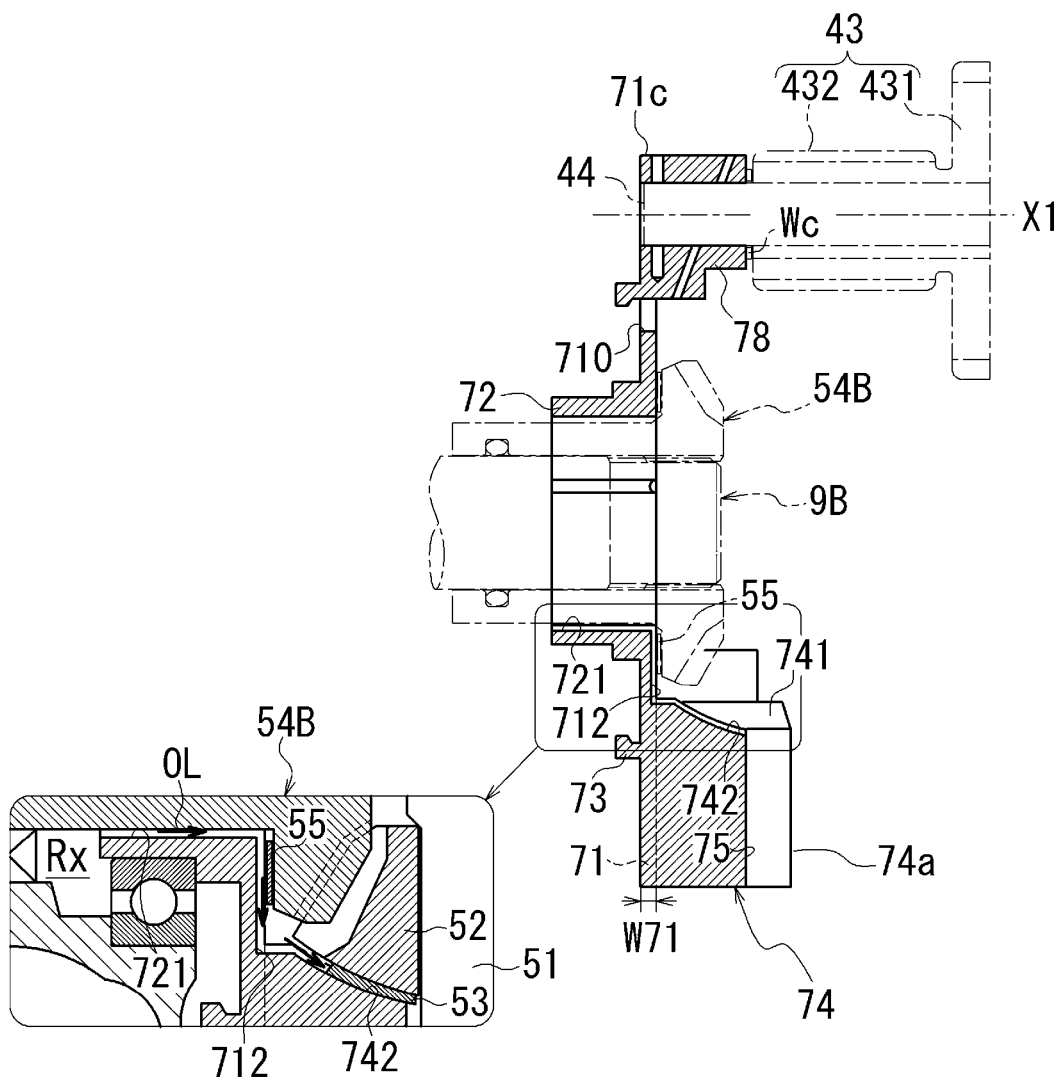
FIG. 14 is a drawing for explaining the second case unit of the differential mechanism.

FIG. 14 is a schematic diagram of the A-A cross section in FIG. 12. FIG. 14 shows the arrangement of the side gear 54B, the stepped pinion gear 43, and the drive shaft 9B using virtual lines while omitting an illustration of the linking part 74 at the paper surface back side.

Figure 15:
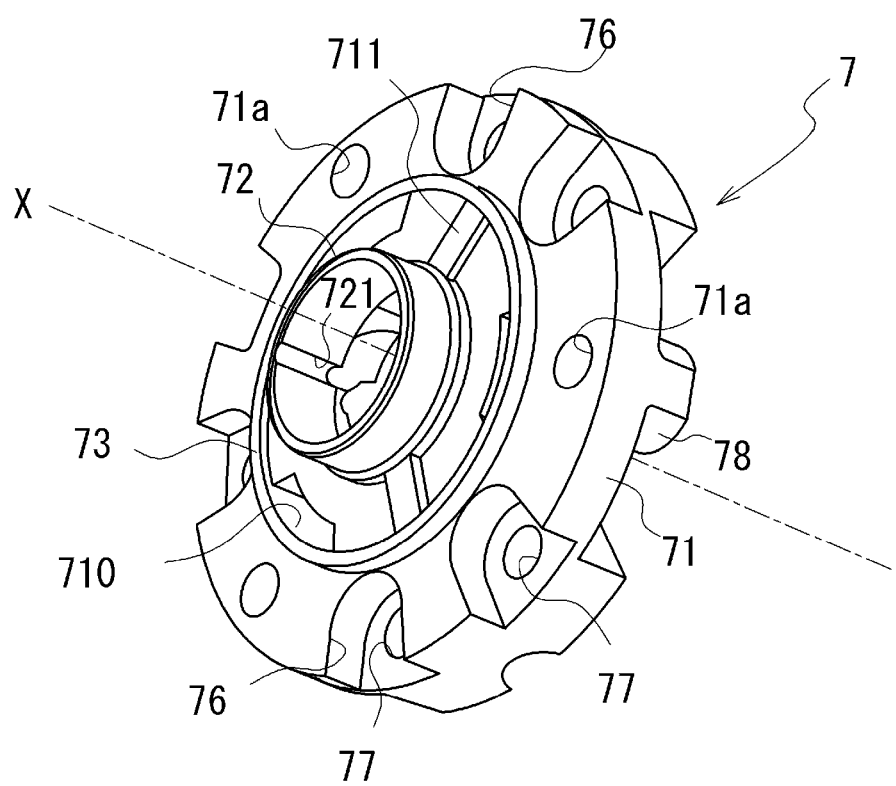
FIG. 15 is a drawing for explaining the second case unit of the differential mechanism.

FIG. 15 is a perspective view of the second case unit 7 seen from the side opposite to the first case unit 6.

Figure 16:
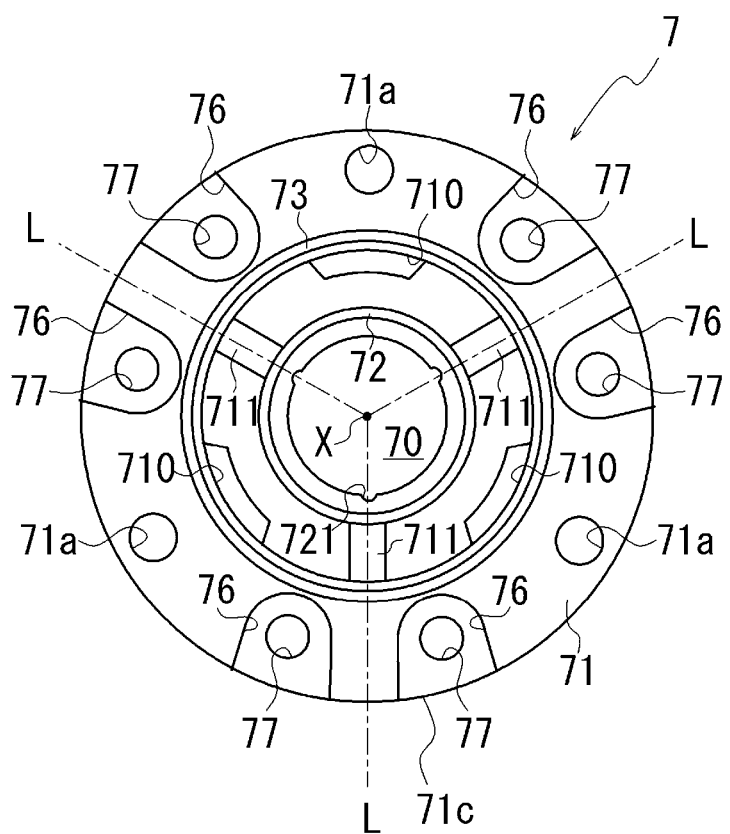
FIG. 16 is a drawing for explaining the second case unit of the differential mechanism.

FIG. 16 is a plan view of the second case unit 7 seen from the side opposite to the first case unit 6.

As shown in FIG. 13 and FIG. 14, the second case unit 7 has the ring-shaped base 71.

The base 71 is a plate-shaped member having a thickness W71 in the rotation axis X direction.

A through hole 70 that penetrates the base 71 in the thickness direction is provided at the center of the base 71.

A cylinder wall part 72 that surrounds the through hole 70 and a peripheral wall part 73 that surrounds the cylinder wall part 72 with a gap open are provided at the surface on the side opposite to the first case unit 6 (left side in the drawing) in the base 71.

A projection 73a that projects to the rotation axis X side is provided at the tip of the peripheral wall part 73. The projection 73a is provided across the entire circumference in the circumferential direction around the rotation axis X.

As shown in FIG. 16, three support holes 71a of the pinion shaft 44 are open at the outer diameter side of the peripheral wall part 73. The support holes 71a are provided at intervals in the circumferential direction around the rotation axis X.

Three slits 710 penetrating the base 71 in the thickness direction are provided on the inner diameter side of peripheral wall part 73.

Seen from the rotation axis X direction, the slits 710 form an arc shape along the inner circumference of the peripheral wall part 73. The slits 710 are formed in a prescribed angle range in the circumferential direction around the rotation axis X.

The slits 710 in the second case unit 7 are provided at intervals in the circumferential direction around the rotation axis X. Each of the slits 710 is provided crossing the inner diameter side of the support hole 71a in the circumferential direction around the rotation axis X.

Three projecting walls 711 projecting to the paper surface front side are provided between adjacent slits 710, 710 in the circumferential direction around the rotation axis X. The projecting walls 711 extend in a straight line in the radial direction of the rotation axis X. The projecting walls 711 are provided connecting the peripheral wall part 73 of the outer diameter side and the cylinder wall part 72 of the inner diameter side.

Three projecting walls 711 are provided at intervals in the circumferential direction around the rotation axis X. The projecting walls 711 are provided with a phase shift of approximately 45 degrees in the circumferential direction around the rotation axis X with respect to the slits 710.

Bolt housing parts 76, 76 recessed at the paper surface back side are provided between support holes 71a, 71a adjacent in the circumferential direction around the rotation axis X at the outer diameter side of peripheral wall part 73. These bolt housing parts 76, 76 are provided in a positional relationship that is symmetrical with the radius line L sandwiched between. The bolt housing parts 76 open at an outer circumference 71c of the base 71.

Bolt insertion holes 77 open at the inside of the bolt housing parts 76. The insertion holes 77 penetrate the base 71 in the thickness direction (rotation axis X direction).

As shown in FIG. 11 and FIG. 12, the three linking parts 74 projecting to the first case unit 6 side are provided on the surface of the first case unit 6 side (right side in the drawing) in the base 71.

The linking parts 74 are provided at equal intervals in the circumferential direction around the rotation axis X. The linking parts 74 are formed at a width W7 in the same circumferential direction as the linking parts 64 of the first case unit 6 side.

As shown in FIG. 13, a tip surface 74a of the linking part 74 is a flat surface orthogonal to the rotation axis X. A support groove 75 for supporting the pinion mate shaft 51 is provided on the tip surface 74a.

As shown in FIG. 12, the support groove 75 seen from the rotation axis X direction is formed in a straight line along the radius line L of the base 71. The support groove 75 is formed crossing the linking part 74 from the inner diameter side to the outer diameter side.

As shown in FIG. 5, the support groove 75 forms a semicircle shape along the outer diameter of the pinion mate shaft 51.

As shown in FIG. 13, the support groove 75 is formed at a depth capable of housing half of the cylindrical pinion mate shaft 51. Specifically, the support groove 75 is formed at a depth corresponding to half the diameter Da (=Da/2) of the pinion mate shaft 51.

An arc part 741 is provided along the outer circumference of the pinion mate gear 52 on the inner diameter side (rotation axis X side) of the linking part 74.

In the arc part 741, the outer circumference of the pinion mate gear 52 is supported with the spherical washer 53 interposed (see FIG. 13 and FIG. 14).

An oil groove 742 facing along the radius line L noted above is provided in the arc part 741. The oil groove 742 is provided in a range from the support groove 75 of the pinion mate shaft 51 to the base 71 positioned at the inner circumference of the linking part 74.

The oil groove 742 connects with an oil groove 712 provided in a front surface 71b of the base 71. The oil groove 712 seen from the rotation axis X direction is provided along the radius line L, and is formed to the through hole 70 provided in the base 71.

The ring-shaped washer 55 that supports the back surface of the side gear 54B is placed on the front surface 71b of the base 71. A cylindrical cylinder wall part 540 is provided on the back surface of the side gear 54B. The washer 55 is externally fitted on the cylinder wall part 540.

An oil groove 721 is formed at the position intersecting the oil groove 712 on the inner circumference of the cylinder wall part 72 surrounding the though hole 70. The oil groove 721 is provided facing along the rotation axis X across the entire length of the rotation axis X direction of the cylinder wall part 72 on the inner circumference of the cylinder wall part 72.

As shown in FIG. 11 and FIG. 12, the guide unit 78 is provided between linking parts 74, 74 adjacent in the circumferential direction around the rotation axis X at the base 71 of the second case unit 7. The guide unit 78 projects to the first case unit 6 side (paper surface front side).

The guide unit 78 forms a cylinder seen from the rotation axis X direction. The guide unit 78 surrounds the support hole 71a provided in the base 71. The outer circumference part of the guide unit 78 is cut along the outer circumference 71c of the base 71.

As shown in FIG. 13 and FIG. 14, in the cross section view along the axis line X1, the pinion shaft 44 is inserted from the first case unit 6 side in the support hole 71a of the guide unit 78. The pinion shaft 44 is positioned by the positioning pin P in a state with the rotation around the axis line X1 regulated.

In this state, the small diameter gear part 432 of the stepped pinion gear 43 externally fitted on the pinion shaft 44 abuts the guide unit 78 from the axis line X1 direction with the washer We sandwiched between.

As shown in FIG. 4, in the differential case 50, a bearing B2 is externally fitted on the cylinder wall part 72 of the second case unit 7. The bearing B2 that is externally fitted on the cylinder wall part 72 is held by a support unit 145 of the fourth box 14. The cylinder wall part 72 of the differential case 50 is supported to be rotatable with the fourth box 14 with the bearing B2 interposed.

The drive shaft 9B that penetrates an opening 145a of the fourth box 14 is inserted from the rotation axis X direction in the support unit 145. The drive shaft 9B is supported to be rotatable with the support unit 145.

The lip seal RS is fixed to the inner circumference of the opening 145a. The lip section (not illustrated) of the lip seal RS is elastically in contact with the outer circumference of the cylinder wall part 540 of the side gear 54B externally fitted on the drive shaft 9B.

As a result, the gap between the outer circumference of the cylinder wall part 540 of the side gear 54B and the inner circumference of the opening 145a is sealed.

The first case unit 6 of the differential case 50 is supported by the plate member 8 with the bearing B3 that is externally fitted on the cylinder wall part 611 interposed (see FIG. 2).

The drive shaft 9A that penetrates the insertion hole 130a of the third box 13 is inserted from the rotation axis direction inside the first case unit 6.

The drive shaft 9A is provided crossing the motor shaft 20 of the motor 2 and the inner diameter side of the sun gear 41 of the planetary reduction gear 4 in the rotation axis X direction.

As shown in FIG. 4, in the interior of the differential case 50, side gears 54A, 54B are spline fitted at the outer circumference of the tip end part of the drive shafts 9 (9A, 9B). The side gears 54A, 54B and drive shafts 9 (9A, 9B) are linked to be able to rotate integrally around the rotation axis X.

In this state, the side gears 54A, 54B are arranged facing with a gap open in the rotation axis X direction, and the linking part 510 of the pinion mate shaft 51 is positioned between the side gears 54A, 54B.

In the present embodiment, the total of three pinion mate shafts 51 extend radially outside from the linking part 510. A pinion mate gear 52 is supported on each of the pinion mate shafts 51. The pinion mate gears 52 are assembled in a state with the teeth mutually engaged on the side gear 54A positioned at one side in the rotation axis X direction and the side gear 54B positioned at the other side.

As shown in FIG. 2, the oil OL for lubrication is retained inside the fourth box 14. The bottom side of the differential case 50 is positioned within the retained oil OL.

In the present embodiment, when the linking beam 62 is positioned at the bottommost part, the oil OL is retained up to the height at which the linking beam 62 is positioned within the oil OL.

When the output rotation of the motor 2 is transmitted, the retained oil OL is scooped up by the differential case 50 that rotates around the rotation axis X.

FIG. 17 to FIG. 22 are drawings for explaining the oil catch unit 15.

Figure 17:
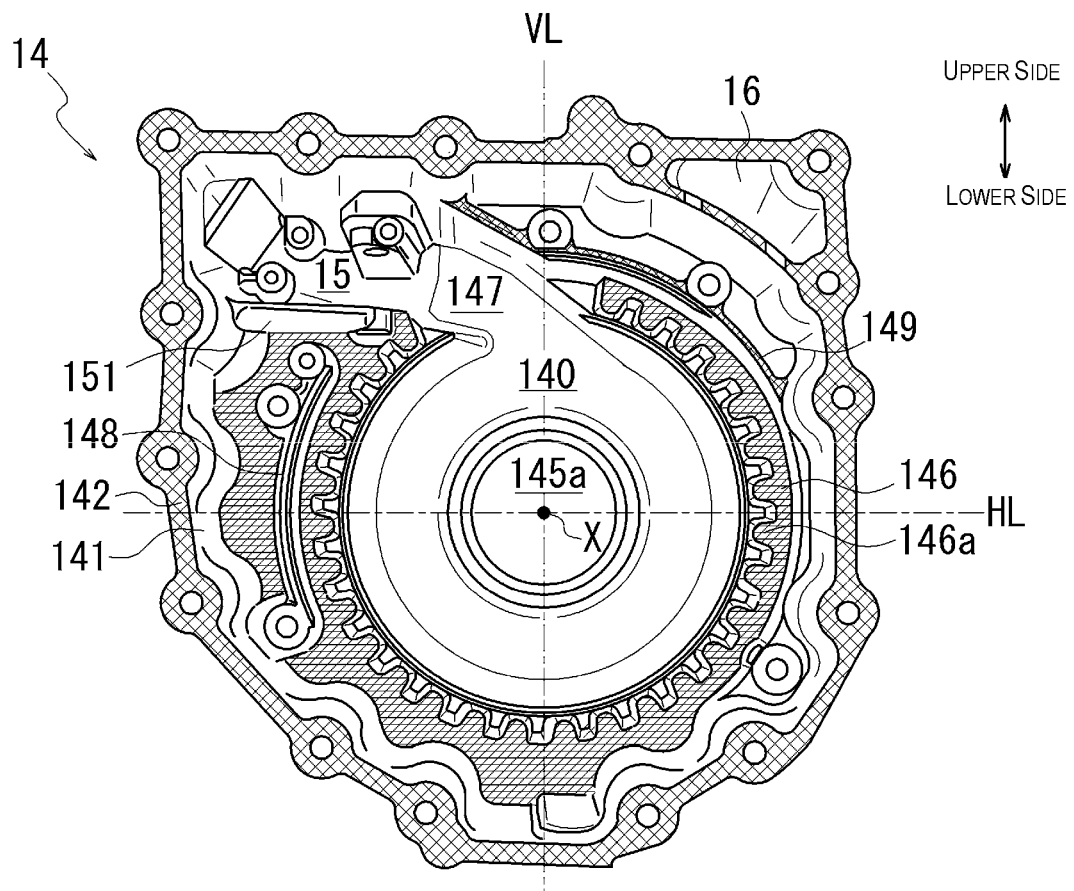
FIG. 17 is a drawing for explaining an oil catch unit.

FIG. 17 is a plan view of the fourth box 14 seen from the third box 13 side.

Figure 18:
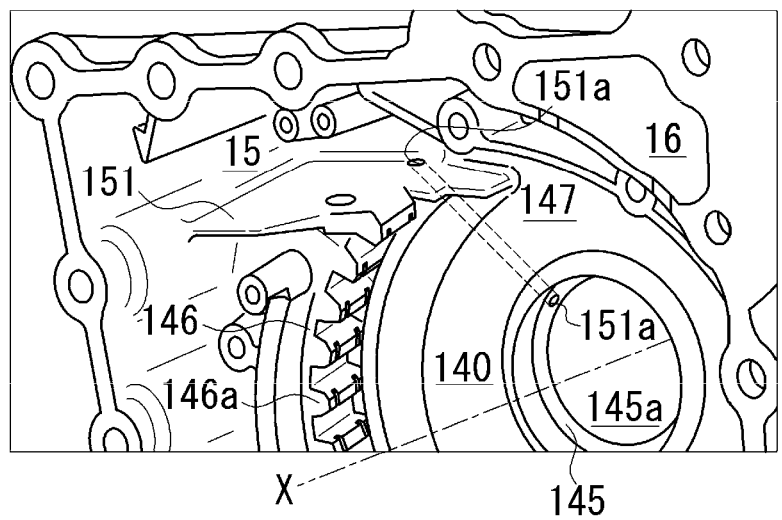
FIG. 18 is a drawing for explaining the oil catch unit.

FIG. 18 is a perspective view of the oil catch unit 15 shown in FIG. 17 seen from diagonally above.

Figure 19:
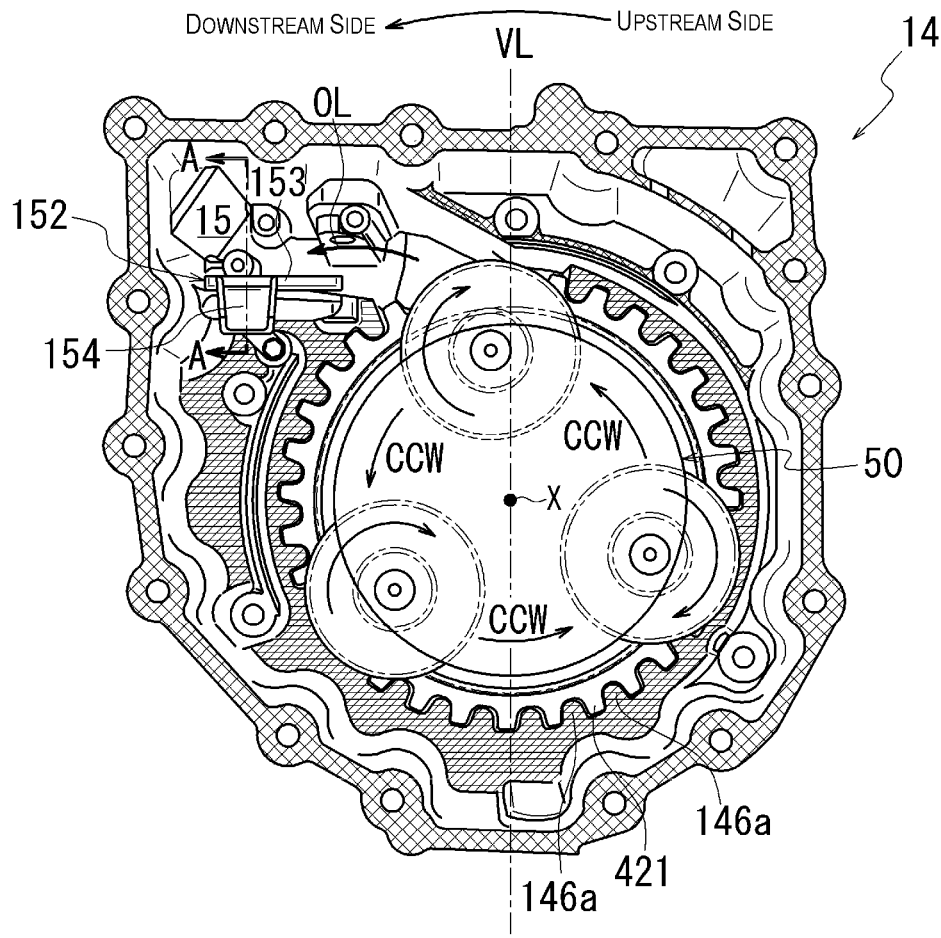
FIG. 19 is a drawing for explaining the oil catch unit.

FIG. 19 is a plan view of the fourth box 14 seen from the third box 13 side. FIG. 19 is a drawing showing the state with the differential case 50 arranged.

Figure 20:
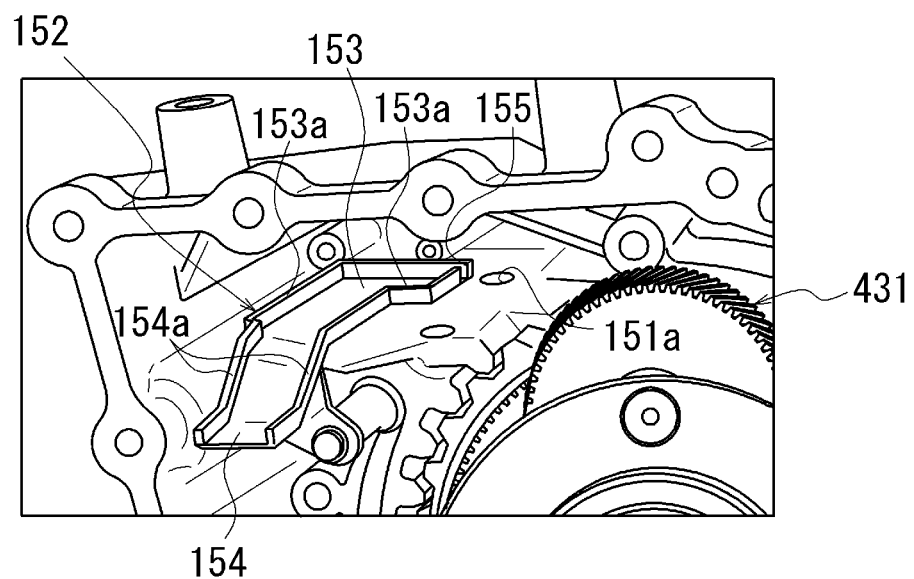
FIG. 20 is a drawing for explaining the oil catch unit.

FIG. 20 is a perspective view of the oil catch unit 15 shown in FIG. 19 seen from diagonally above.

Figure 21:
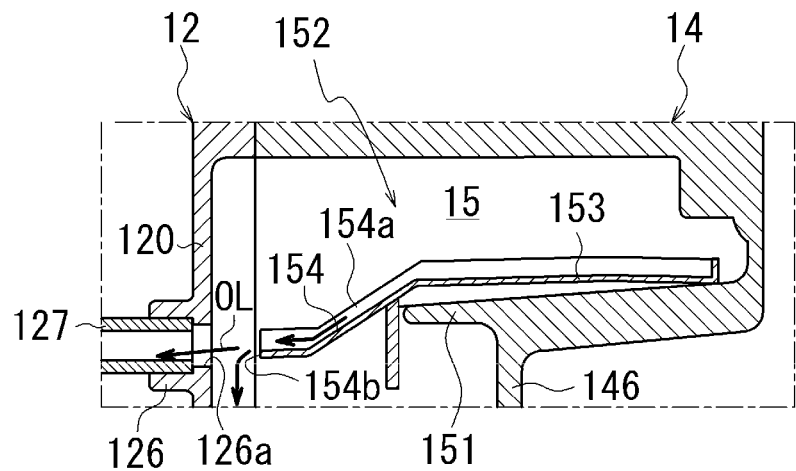
FIG. 21 is a drawing for explaining the oil catch unit.

FIG. 21 is a schematic diagram of the A-A cross section in FIG. 19.

Figure 22:
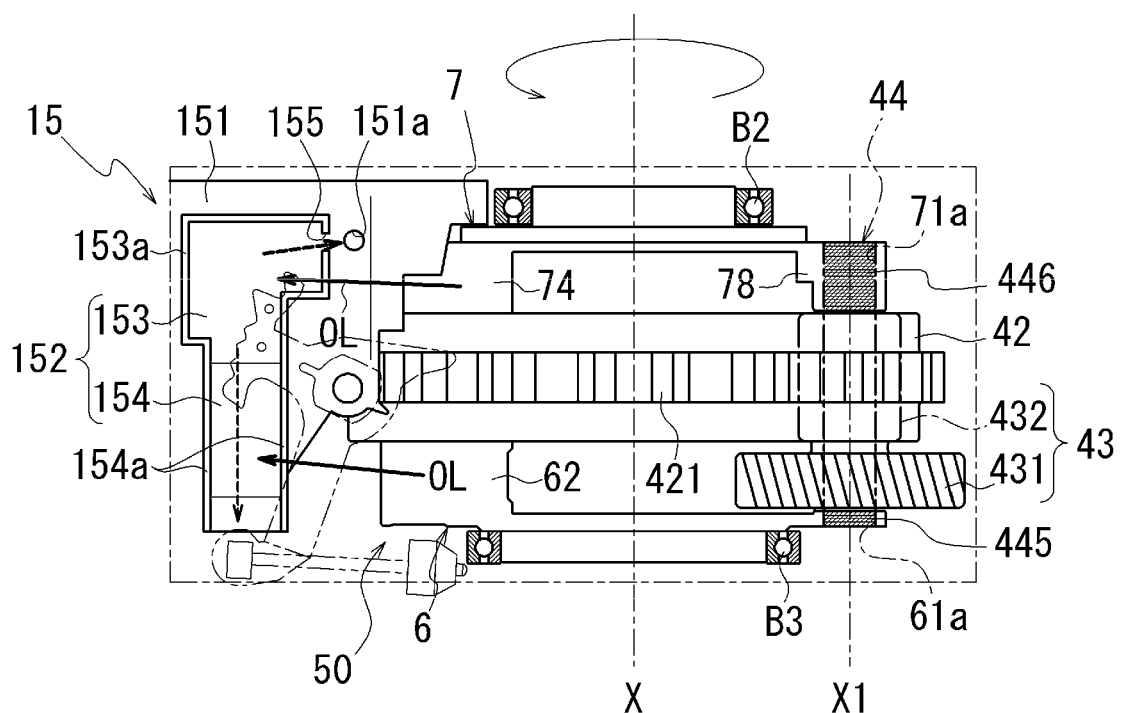
FIG. 22 is a drawing for explaining the oil catch unit.

FIG. 22 is a schematic diagram for explaining the positional relationship between the oil catch unit 15 and the differential case 50 (first case unit 6, second case unit 7) when the power transmission device 1 is seen from above.

In FIG. 17 and FIG. 19, to make the position of the junction part 142 of the fourth box 14 and the support wall part 146 clear, these are shown marked by cross hatching.

As shown in FIG. 17, the support wall part 146 surrounding the center opening 145a with a gap open is provided in the fourth box 14 seen from the rotation axis X direction. The inside (rotation axis X) side of the support wall part 146 is a housing unit 140 of the differential case 50 (see FIG. 19).

A space of the oil catch unit 15 and a space of a breather chamber 16 are formed on the top part inside the fourth box 14.

In the support wall part 146 of the fourth box 14, a communication port 147 that communicates between the oil catch unit 15 and the housing unit 140 of the differential case 50 is provided in the region intersecting a vertical line VL.

As shown in FIG. 17, the oil catch unit 15 and the breather chamber 16 are respectively positioned at one side (left side in the drawing) and the other side (right side in the drawing) sandwiching the vertical line VL that is orthogonal to the rotation axis X.

The oil catch unit 15 is arranged at a position offset from the vertical line VL passing through the rotation center of the differential case 50 (rotation axis X). As shown in FIG. 22, when viewing the oil catch unit 15 from above, the oil catch unit 15 is arranged at a position offset from directly above the differential case 50.

Here, the vertical line VL is a vertical line VL with the installation state of the power transmission device 1 in the vehicle as reference. Seen from the rotation axis X direction, the vertical line VL is orthogonal to the rotation axis X.

In the explanation hereafter, the horizontal line HL is the horizontal line HL with the installation state of the power transmission device 1 in the vehicle as reference. Seen from the rotation axis X direction, the horizontal line HL is orthogonal to the rotation axis X (see FIG. 17).

As shown in FIG. 18, the oil catch unit 15 is formed extending to the paper surface back side from the support wall part 146. A support stand 151 projecting to the paper surface front side is provided on the bottom edge of the oil catch unit 15. The support stand 151 is provided in a range on the paper surface front side from the support wall part 146, to the paper surface back side from the junction part 142 of the fourth box 14.

As shown in FIG. 17, seen from the rotation axis X direction, the communication port 147 that communicates between the oil catch unit 15 and the housing unit 140 of the differential case 50 is formed on the vertical line VL side (right side in the drawing) of the oil catch unit 15. The communication port 147 is formed with a portion of the support wall part 146 cut out.

Seen from the rotation axis X direction, the communication port 147 is provided in a range crossing the vertical line VL from the breather chamber 16 side (right side in the drawing) to the oil catch unit 15 side (left side in the drawing).

As shown in FIG. 19, in the present embodiment, during forward travel of the vehicle in which the power transmission device 1 is mounted, seen from the third box 13 side, the differential case 50 rotates in the counterclockwise direction CCW around the rotation axis X.

For that reason, the oil catch unit 15 is positioned at the downstream side in the rotation direction of the differential case 50. For the width in the circumferential direction of the communication port 147, the left side sandwiching the vertical line VL is wider than the right side. The left side sandwiching the vertical line VL is at the downstream side in the rotation direction of the differential case 50, and the right side is the upstream side. As a result, much of the oil OL scooped up by the differential case 50 rotating around the rotation axis X can flow into the oil catch unit 15.

Furthermore, as shown in FIG. 22, the outer circumference position of the rotational orbit of a second shaft part 446 of the pinion shaft 44 noted above and the outer circumference position of the rotational orbit of the large diameter gear part 431 are offset in the radial direction of the rotation axis X. The outer circumference position of the rotational orbit of the second shaft part 446 is positioned more to the inner diameter side than the outer circumference position of the rotational orbit of the large diameter gear part 431. For that reason, there is a spatial margin at the outer diameter side of the second shaft part 446. By providing the oil catch unit 15 using this space, it is possible to effectively use the space inside the body box 10.

Also, the second shaft part 446 projects to the back side of the small diameter gear part 432 seen from the motor 2. The peripheral member of the second shaft part 446 (e.g. the guide unit 78 of the differential case 50 that supports the second shaft part 446) is at a position near the oil catch unit 15.

Thus, it is possible to smoothly perform supplying of the oil OL (lubricating oil) from that peripheral member to the oil catch unit 15.

As shown in FIG. 18, the end part of the outer diameter side of the oil hole 151a is open at the back side of the support stand 151. The oil hole 151a extends to the inner diameter side inside the fourth box 14. The end part of the inner diameter side of the oil hole 151a is open on the inner circumference of the support unit 145.

As shown in FIG. 2, the end part of the inner diameter side of the oil hole 151a in the support unit 145 is open between the lip seal RS and the bearing B2.

As shown in FIG. 20 and FIG. 22, an oil guide 152 that functions as a guide member for the oil OL is placed on the support stand 151.

The oil guide 152 has a catch unit 153, and a guide unit 154 extending from the catch unit 153 to the first box 11 side (paper surface front side in FIG. 20).

As shown in FIG. 22, seen from above, the support stand 151 is provided radially outside the rotation axis X, at a position partially overlapping the differential case 50 (first case unit 6, second case unit 7), and to avoid interference with the stepped pinion gear 43 (large diameter gear part 431).

Seen from the radial direction of the rotation axis X, the catch unit 153 is provided at a position overlapping the second shaft part 446 of the pinion shaft 44. Furthermore, the guide unit 154 is provided at a position where the first shaft part 445 of the pinion shaft 44 and the large diameter gear part 431 overlap.

For that reason, when the differential case 50 rotates around the rotation axis X, the oil OL scooped up by the differential case 50 moves toward the catch unit 153 and the guide unit 154 side.

As shown in FIG. 20, a wall part 153a is provided extending in the direction separating (upward) from the support stand 151 on the outer circumference edge of the catch unit 153. A portion of the oil OL scooped up by the differential case 50 rotating around the rotation axis X is retained in the oil guide 152.

A notch part 155 is provided in the wall part 153a at the back side of the catch unit 153 (paper surface back side in FIG. 20).

As shown in FIG. 22, the notch part 155 is provided in a region facing the oil hole 151a. A portion of the oil OL retained in the catch unit 153 is discharged from the notch part 155 portion toward the oil hole 151a.

As shown in FIG. 21, the guide unit 154 is inclined downward as it separates from the catch unit 153.

As shown in FIG. 20, wall parts 154a, 154a are provided at both sides in the width direction of the guide unit 154. The wall parts 154a, 154a are provided across the entire length in the lengthwise direction of the guide unit 154. The wall parts 154a, 154a are connected to the wall part 153a that surrounds the outer circumference of the catch unit 153.

A portion of the oil OL retained in the catch unit 153 is also discharged to the guide unit 154 side.

As shown in FIG. 21, in the guide unit 154, the position that avoids interference with the differential case 50 extends to the second box 12 side. A tip 154b of the guide unit 154 faces an oil hole 126a provided on the wall part 120 of the second box 12 with a gap open in the rotation axis X direction.

A boss part 126 that surrounds the oil hole 126a is provided on the outer circumference of the wall part 120. One end of a pipe 127 is fitted into the boss part 126 from the rotation axis X direction.

The pipe 127 passes through the outside of the second box 12 to the third box 13. The other end of the pipe 127 communicates with the oil hole 136a provided in the cylindrical connecting wall 136 of the third box 13 (see FIG. 2).

As shown in FIG. 19, a portion of the oil OL scooped up by the differential case 50 rotating around the rotation axis X reaches the oil catch unit 15. As shown in FIG. 21, the oil OL passes through the guide unit 154 and the pipe 127, and is supplied to the internal space Sc of the connecting wall 136 (see FIG. 2).

As shown in FIG. 2, a radial oil passage 137 that communicates with the internal space Sc is provided in the third box 13.

The radial oil passage 137 extends radially downward from the internal space Sc. The radial oil passage 137 communicates with the axial oil passage 138 provided inside the junction part 132.

The axial oil passage 138 connects with the oil reservoir 128 provided at the bottom of the second box 12 via the communication hole 112a provided in the junction part 112 of the first box 11.

The oil reservoir 128 penetrates inside the peripheral wall part 121 in the rotation axis X direction. The oil reservoir 128 connects with the gear chamber Sb provided in the fourth box 14.

In the gear chamber Sb, the disc-shaped plate member 8 is provided facing orthogonal to the rotation axis X. As described above, in the plate member 8, the gear chamber Sb inside the fourth box 14 is partitioned into a first gear chamber Sb1 on the differential case 50 side, and a second gear chamber Sb2 on the motor 2 side.

In the vertical line VL direction with the state of the power transmission device 1 mounted in the vehicle as reference, the bottom of the plate member 8 is provided with a gap open with the peripheral wall part 141 of the fourth box 14.

The first gear chamber Sb1 positioned at one side of the plate member 8 and the second gear chamber Sb2 positioned at the other side communicate with each other at the bottom of the fourth box 14.

The plate member 8 is formed at a size that covers the side surface of the motor 2 side of the differential case 50. The plate member 8 suppresses the inflow of the oil OL scooped up by the rotating differential case 50 to the second gear chamber Sb2 side.

Figure 23:
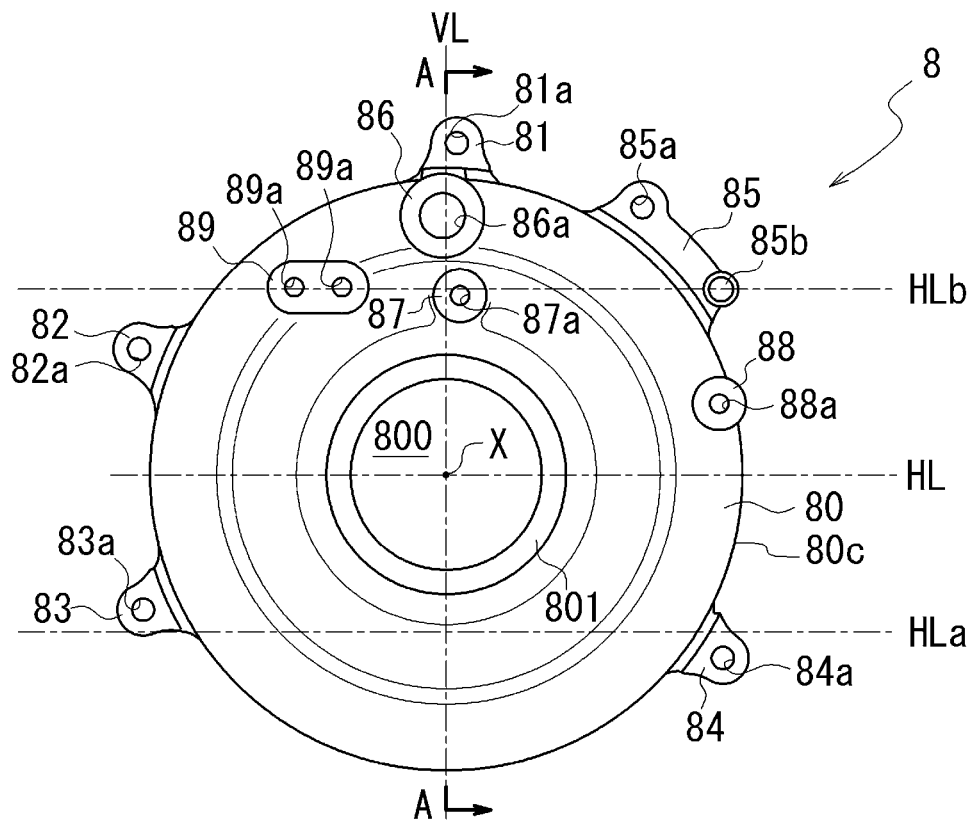
FIG. 23 is a drawing for explaining a plate member.
Figure 24:
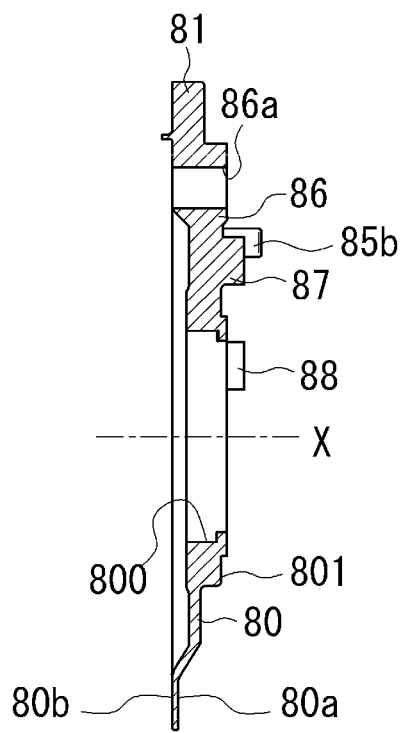
FIG. 24 is a drawing for explaining the plate member.

FIG. 23 and FIG. 24 are drawings that explain the plate member 8.

FIG. 23 is a plan view of the plate member 8 seen from the motor 2 side.

FIG. 24 is a schematic drawing of the A-A cross section in FIG. 23.

As shown in FIG. 23, seen from the motor 2 side, the plate member 8 has a ring-shaped base 80. At the center of the base 80, a ring-shaped support part 801 is provided surrounding a through hole 800.

As shown in FIG. 3, at the inner circumference of the support part 801, the cylinder wall part 611 of the differential case 50 is supported with the bearing B3 interposed.

As shown in FIG. 23, connecting pieces 81, 82, 83, 84 are provided on an outer circumference edge 80c of the base 80.

Each of the connecting pieces 81, 82, 83, 84 extends radially outward from the outer circumference edge 80c of the base 80. Bolts 81a, 82a, 83a, 84a are provided respectively in the connecting pieces 81, 82, 83, 84.

The connecting piece 81 is provided at a position intersecting the vertical line VL on the top part of the plate member 8. The connecting piece 81 extends in the direction separating from the base 80 along the vertical line VL.

At one side of the vertical line VL (left side in FIG. 23), one each of the connecting pieces 82, 83 is provided respectively on the upper side and the lower side sandwiching the horizontal line HL. These connecting pieces 82, 83 also extend in the direction separating from the base 80.

At the other side of the vertical line VL (right side in the FIG. 23), the connecting piece 84 is provided below the horizontal line HL. This connecting piece 84 passes through the lower edge of the connecting piece 83 noted above at the lower side of the horizontal line HL. The connecting piece 84 projects downward from the position intersecting a straight line HLa parallel to the horizontal line HL.

At the other side of the vertical line VL (right side in FIG. 23), the connecting piece 85 is provided above the horizontal line HL. The connecting piece 85 has a prescribed width in the circumferential direction around the rotation axis X. A bolt 85a is provided at a position near the vertical line VL in the connecting piece 85. A support pin 85b is provided at a position near the horizontal line HL. The support pin 85b projects to the paper surface front side.

A supporting boss 86 of a stopper pin 861 described later is provided at a surface 80a of the motor 2 side in the plate member 8 (see FIG. 24).

The supporting boss 86 is positioned below the connecting piece 81 positioned on the vertical line VL. The supporting boss 86 is adjacent to the connecting piece 81.

As shown in FIG. 23, an attachment boss 87 is provided below the supporting boss 86. The attachment boss 87 passes through the support pin 85b and is provided at a position intersecting a straight line HLb parallel to the horizontal line HL noted above. The attachment boss 87 projects to the paper surface front side from the supporting boss 86 (see FIG. 24).

Furthermore, an attachment boss 88 paired with the attachment boss 87 is provided below the support pin 85b in the vertical line VL direction.

Seen from the attachment boss 87, an attachment part 89 of a support 33 described later is provided on the side opposite to the support pin 85b (left side in the drawing).

In the attachment part 89, two bolt holes 89a, 89a adjacent in the horizontal line HL direction are provided.

Figure 25:
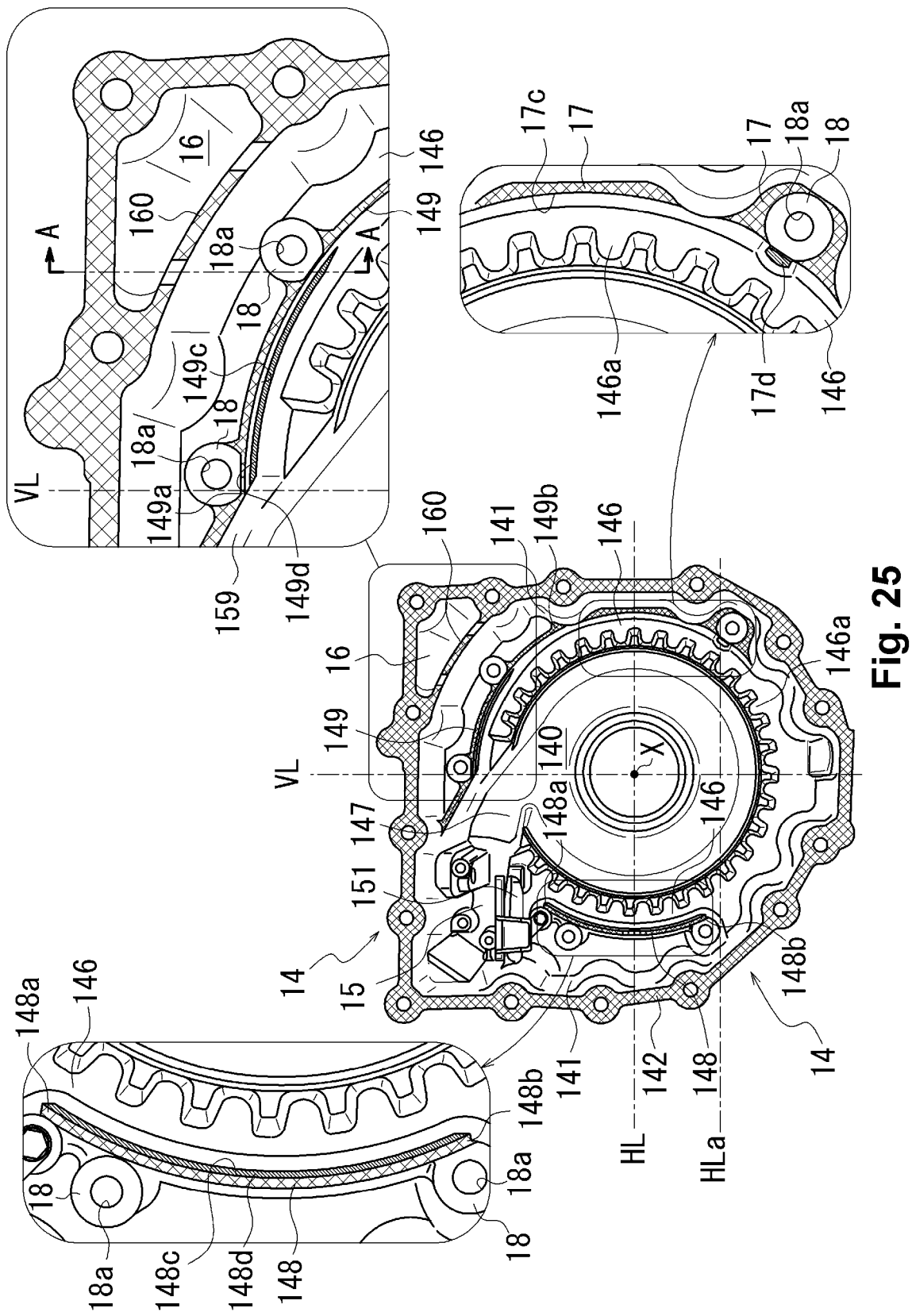
FIG. 25 is a drawing of a fourth box seen from the motor side.

FIG. 25 is a drawing of the fourth box 14 seen from the motor 2 side. In FIG. 25, the arrangement of steps 148d, 149d, 17d supporting the outer circumference edge of the plate member 8 is shown.

In FIG. 25, to clarify the position of the peripheral wall parts 148, 149, and the arc-shaped wall part 17, and the position of the steps 148d, 149d, 17d, these are shown marked by cross hatching.

Figure 26:
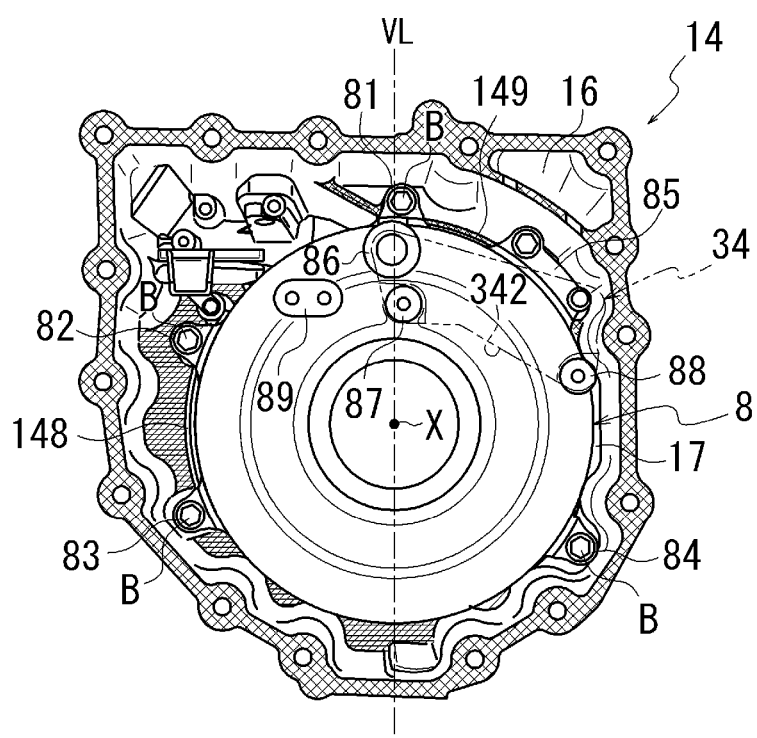
FIG. 26 is a drawing of the fourth box seen from the motor side.

FIG. 26 is a drawing of the fourth box 14 seen from the motor 2 side. FIG. 26 shows the state with the plate member 8 attached.

As shown in FIG. 25, peripheral wall parts 148, 149 are provided on the fourth box 14 seen from the rotation axis X direction. These peripheral wall parts 148, 149 are positioned at the outer diameter side of a region in which teeth 146a are provided in the support wall part 146.

The peripheral wall parts 148, 149 are formed in an arc shape with the rotation axis X as the center.

The peripheral wall part 148 is positioned below the oil catch unit 15 noted above in the vertical line VL direction.

Seen from the rotation axis X direction, the peripheral wall part 148 is provided in a range crossing the horizontal line HL that passes through the rotation axis X from the upper side to the lower side.

An end part 148a on the upper side of the peripheral wall part 148 is positioned in the vicinity of the support stand 151. An end part 148b on the lower side of the peripheral wall part 148 is positioned in the vicinity of the straight line HLa.

As shown in FIG. 25, an inner circumference 148c of the peripheral wall part 148 seen from the rotation axis X direction forms an arc shape along the outer circumference of the plate member 8 (base 80) noted above. The inner diameter of the inner circumference 148c of the peripheral wall part 148 with the rotation axis X as a reference is slightly larger than the outer diameter of the plate member 8 with the rotation axis X as a reference.

The step 148d recessed to the paper surface back side is provided on the inside of the peripheral wall part 148.

When the plate member 8 is attached to the fourth box 14, the outer circumference edge of the plate member 8 (base 80) abuts the step 148d. The plate member 8 (base 80) abuts the step 148d from the rotation axis X direction.

Two boss parts 18 having a bolt hole 18a are provided on the outside of the peripheral wall part 148. The boss parts 18, 18 are formed integrally with the peripheral wall part 148. The boss parts 18, 18 are respectively provided at the end part 148a side of the upper side of the peripheral wall part 148 and in the vicinity of the end part 148b of the lower side. The boss parts 18, 18 project to the paper surface front side from the peripheral wall part 148.

The peripheral wall part 149 is positioned below the abovementioned breather chamber 16. The peripheral wall part 149 is positioned at the paper surface back side from the wall part 160 that partitions and forms the breather chamber 16.

The end part 149a on the upper side of the peripheral wall part 149 seen from the rotation axis X direction is connected to the boss part 18 on the vertical line VL. A side wall part 159 extending to the oil catch unit 15 side is further connected to the boss part 18. The end part 149b of the lower side of the peripheral wall part 149 is connected to the peripheral wall part 141 of the fourth box 14 below the breather chamber 16.

As shown in FIG. 25, the inner circumference 149c of the peripheral wall part 149 seen from the rotation axis X direction forms an arc shape along the outer circumference of the plate member 8 (base 80) noted above. The inner diameter of the inner circumference 149c of the peripheral wall part 149 with the rotation axis X as the reference is slightly larger than the outer diameter of the plate member 8 with the rotation axis X as the reference.

The step 149d recessed to the paper surface back side is provided on the inside of the peripheral wall part 149.

When the plate member 8 is attached to the fourth box 14, the outer circumference edge of the plate member 8 (base 80) abuts the step 149d. The plate member 8 (base 80) abuts the step 149d from the rotation axis X direction.

Two boss parts 18 having a bolt hole 18a are provided on the outside of the peripheral wall part 149. The boss parts 18, 18 are formed integrally with the peripheral wall part 149. The boss parts 18, 18 are provided with a gap open in the circumferential direction around the rotation axis X. The boss parts 18, 18 are respectively provided at the outer circumference of the end part 148a on the upper side of the peripheral wall part 149 and the outer circumference of the region positioned below the breather chamber 16.

The boss parts 18, 18 project to the paper surface front side from the peripheral wall part 149.

In the fourth box 14, the arc-shaped wall part 17 is provided in a region which is below the breather chamber 16 and below the horizontal line HL. The arc-shaped wall part 17 is provided in a positional relationship with a phase shift of approximately 180 degrees with respect to the peripheral wall part 148 in the circumferential direction around the rotation axis X.

As shown in FIG. 25, seen from the rotation axis X direction, an inner circumference 17c of the arc-shaped wall part 17 forms an arc shape along the outer circumference of the plate member 8 (base 80) noted above. The inner diameter of the inner circumference 17c of the arc-shaped wall part 17 with the rotation axis X as a reference is slightly larger than the outer diameter of the plate member 8 with the rotation axis X as a reference.

In the arc-shaped wall part 17, the boss part 18 having the bolt hole 18a is formed at the position intersecting the straight line HLa noted above. The boss part 18 projects to the paper surface front side from the arc-shaped wall part 17.

The step 17d projects to the inner circumference of the boss part 18 in the rotation axis X direction.

When the plate member 8 is attached to the fourth box 14, the outer circumference edge of the plate member 8 (base 80) abuts the step 17d. The plate member 8 (base 80) abuts the step 17d from the rotation axis X direction.

Here, for attaching the plate member 8 to the fourth box 14, first, the outer circumference edge of the plate member 8 (base 80) abuts the steps 148d, 149d of the peripheral wall parts 148, 149 and the step 17d of the arc-shaped wall part 17 from the rotation axis X direction. Subsequently, bolts B penetrating bolt holes 81a to 85a of the connecting pieces 81 to 85 are screwed into the bolt hole 18a of the corresponding boss part 18 to fix the plate member 8 to the fourth box 14 (see FIG. 26).

Here, the plate member 8 is formed by a constituent material with a greater density than the density of the constituent material of the fourth box 14.

In specific terms, the body box 10 (fourth box) of the power transmission device 1 is formed using a constituent material having aluminum or magnesium as the main component to reduce weight.

In the present embodiment, the plate member 8 is formed from a constituent material using iron, etc., as the main component, the constituent material having a higher density than the constituent material of the body box 10.

Figure 27:
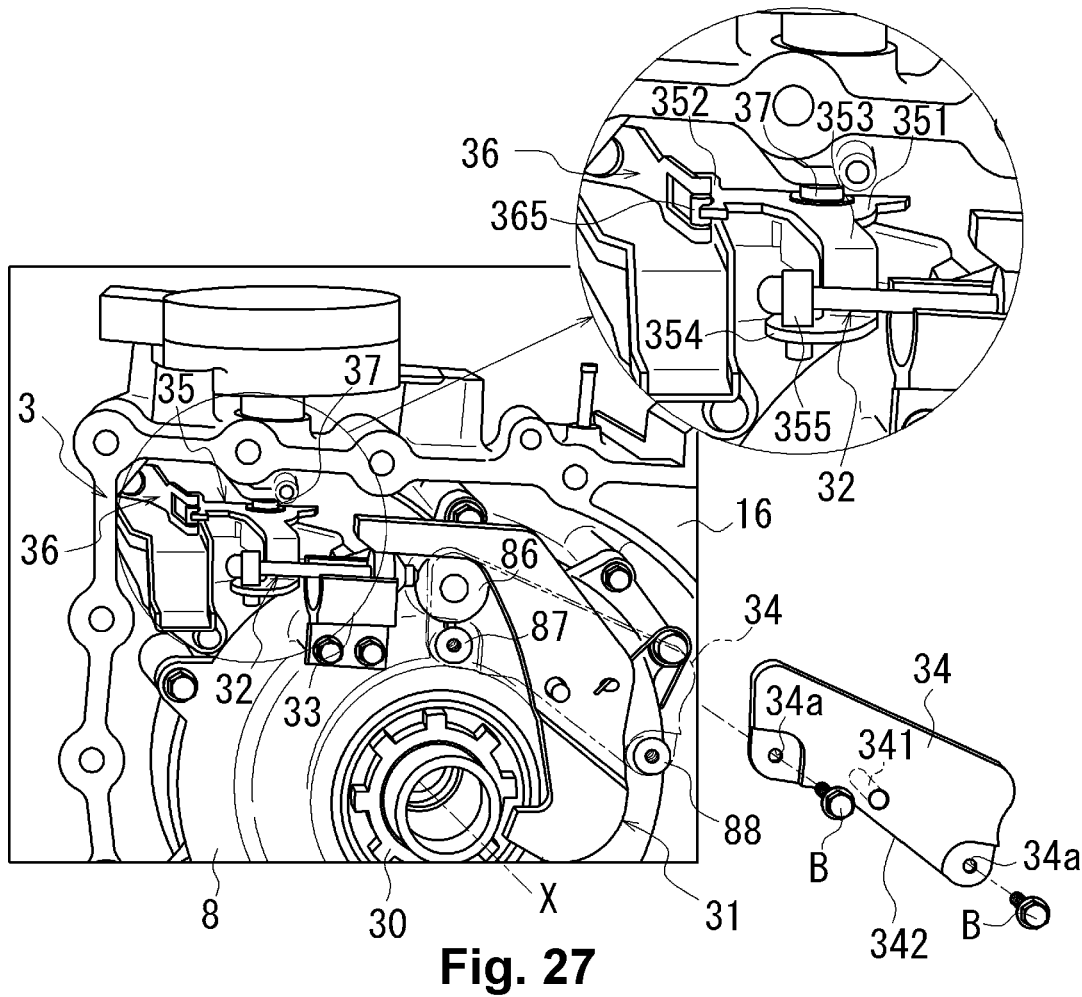
FIG. 27 is a drawing for explaining a park lock mechanism.
Figure 28:
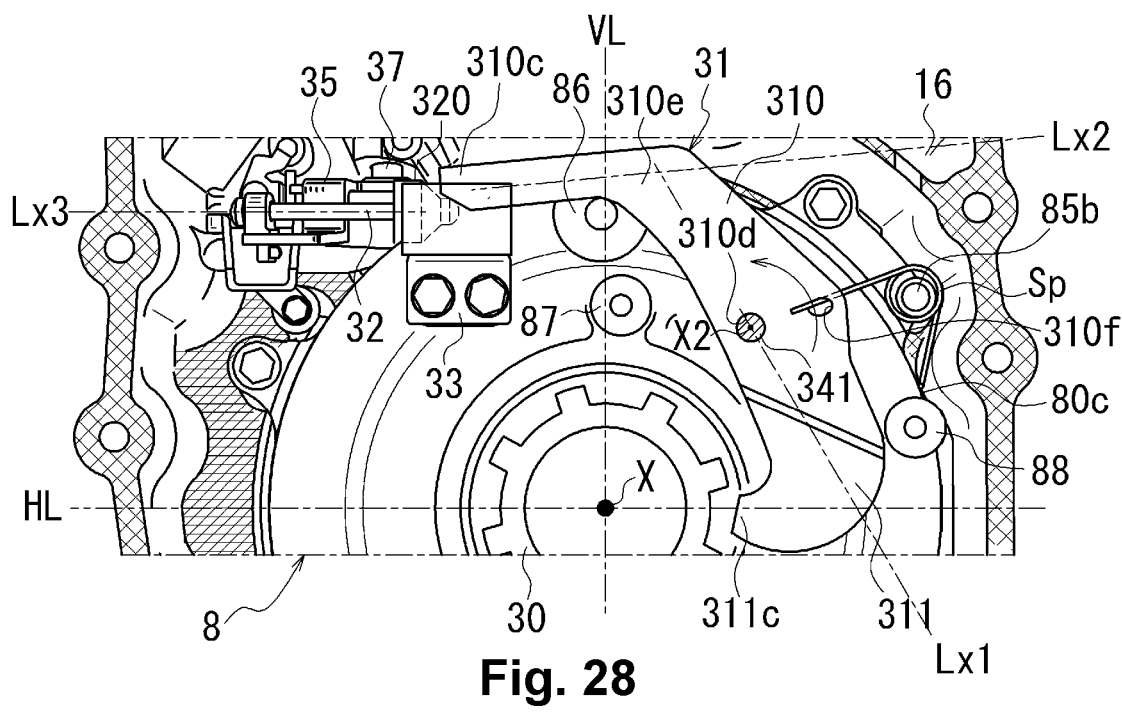
FIG. 28 is a drawing for explaining the park lock mechanism.

FIG. 27 and FIG. 28 are drawings for explaining the park lock mechanism 3.

FIG. 27 is a perspective view of the fourth box 14 in which the park lock mechanism 3 is provided seen from diagonally above.

FIG. 28 is a plan view of the fourth box 14 in which the park lock mechanism 3 is provided seen from the motor 2 side.

Figure 29:
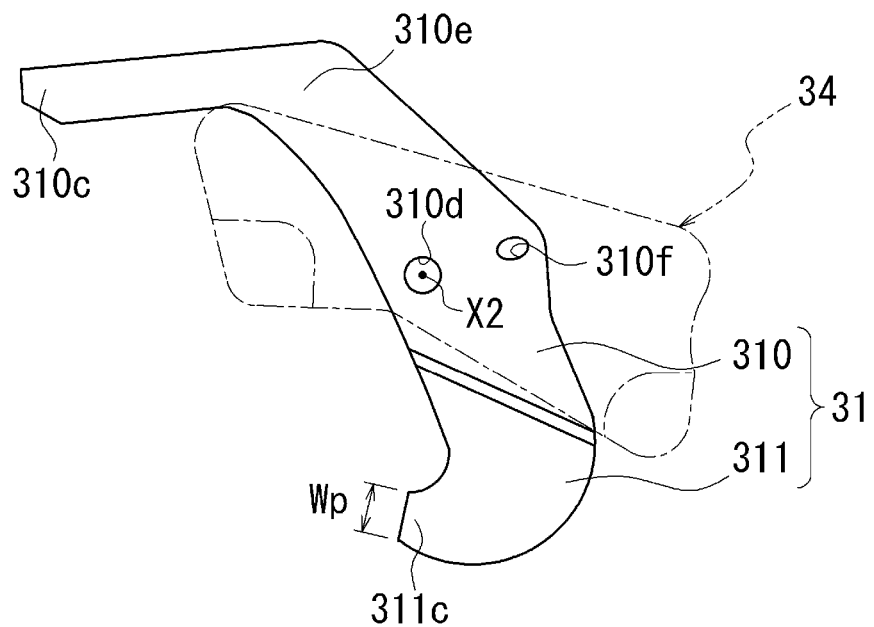
FIG. 29 is a drawing for explaining a parking pawl.
Figure 30:
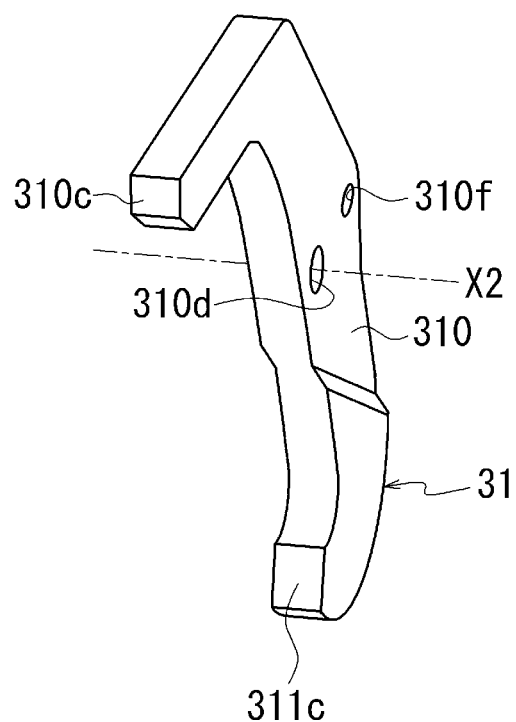
FIG. 30 is a drawing for explaining the parking pawl.
Figure 31:
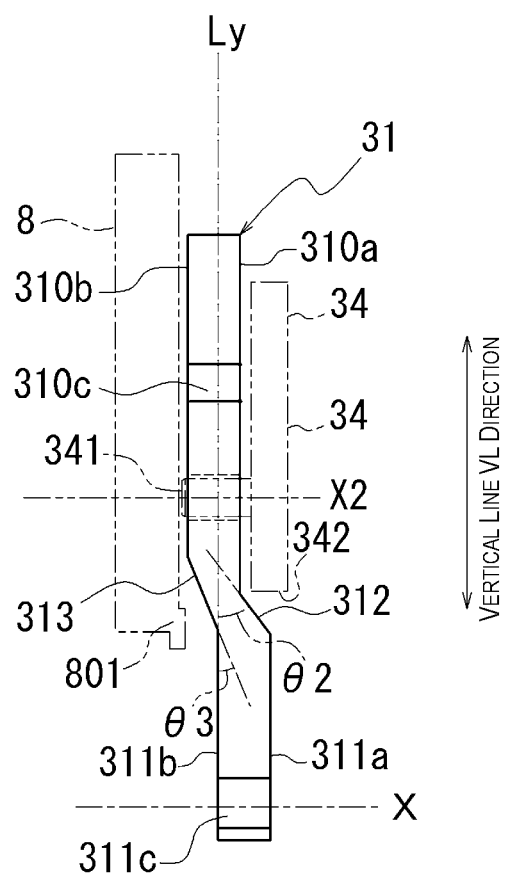
FIG. 31 is a drawing for explaining the parking pawl.

FIG. 29 to FIG. 31 are drawings for explaining a parking pawl 31.

FIG. 29 is a plan view of the parking pawl 31 seen from the motor 2 side.

FIG. 30 is a perspective view of the parking pawl 31 seen from the motor 2 side.

FIG. 31 is a side view of the parking pawl 31 seen from the side of the rotation axis X side.

In FIG. 29, the position of a holder 34 is shown using virtual lines. In FIG. 31, the positions of the plate member 8 and the holder 34 are shown using virtual lines.

Figure 32:
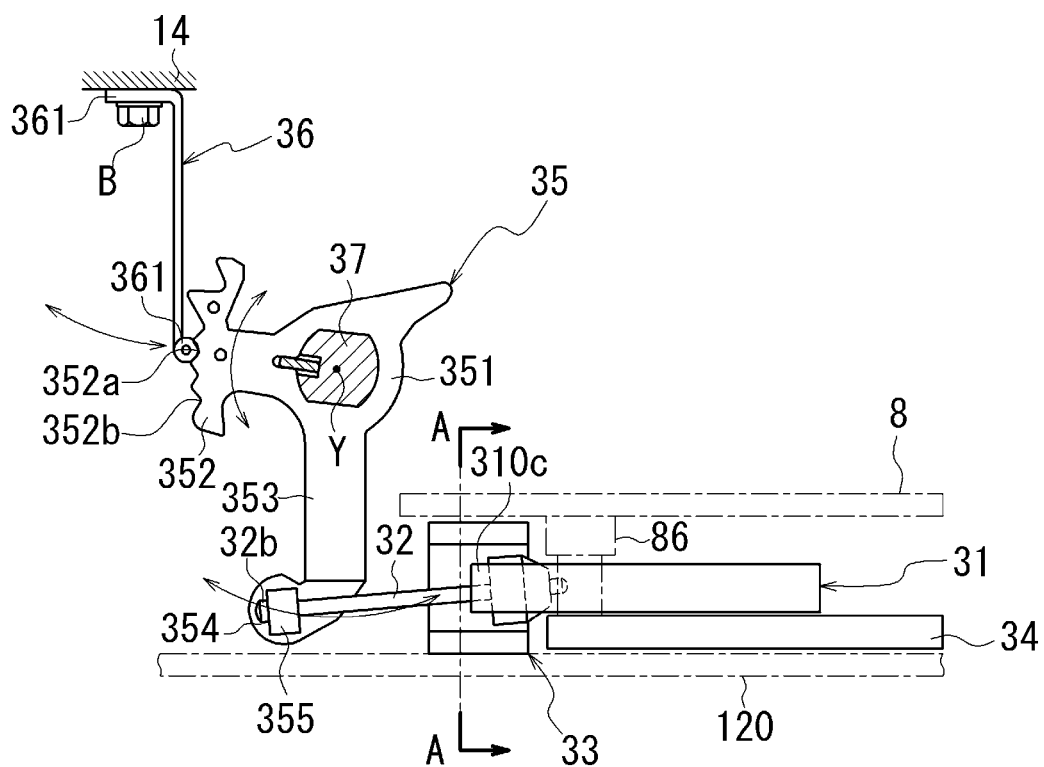
FIG. 32 is a drawing for explaining the park lock mechanism.
Figure 33:
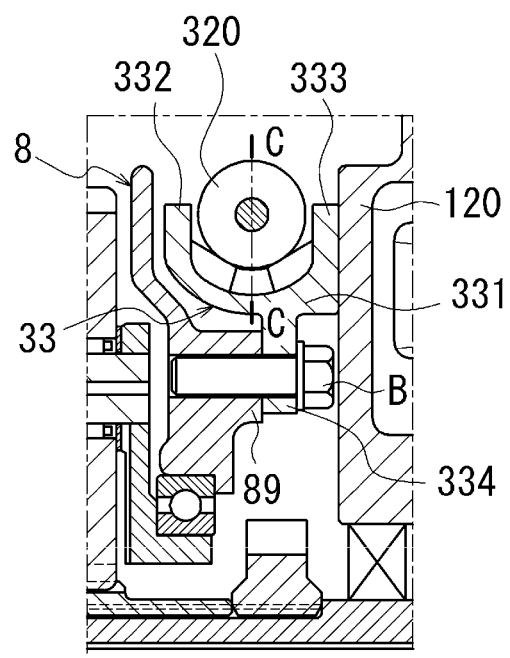
FIG. 33 is a drawing for explaining the park lock mechanism.
Figure 34:
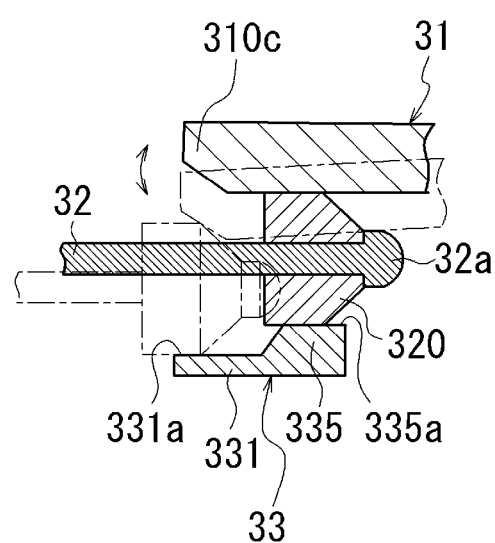
FIG. 34 is a drawing for explaining the park lock mechanism.

FIG. 32 to FIG. 34 are drawings for explaining the park lock mechanism 3.

FIG. 32 is a drawing of the park lock mechanism 3 seen from above.

FIG. 33 is a schematic diagram of cross section A-A in FIG. 32.

FIG. 34 is a schematic diagram of cross section C-C in FIG. 33.

As shown in FIG. 27, the park lock mechanism 3 has a parking gear 30, a parking pawl 31, a parking rod 32, a support 33, a holder 34, a manual plate 35, a detent spring 36, and a manual shaft 37.

In the present embodiment, the parking gear 30, the parking pawl 31, the parking rod 32, the support 33, and the holder 34 are positioned at the motor 2 side of the plate member 8, and the manual plate 35, the detent spring 36, and the manual shaft 37 are positioned at the opposite side.

The holder 34 is a plate-shaped member that forms approximately a rectangular shape when seen from the rotation axis X direction. The holder 34 comprises a projection 341 for supporting the parking pawl 31. Bolt holes 34a, 34a are provided at both sides in the lengthwise direction in the holder 34.

The holder 34 is attached to the attachment bosses 87, 88 of the plate member 8 by bolts B, B.

As shown in FIG. 27, when seen from the rotation axis X direction, the holder 34 is provided in a range from above the parking gear 30 to beneath the breather chamber 16.

As shown in FIG. 26, when seen from the rotation axis X direction, the holder 34 is inclined to the lower side in the vertical line VL direction as it faces the breather chamber 16 side (right side in the drawing). A lower edge 342 of the holder 34 is inclined to the lower side in the vertical line VL direction as it faces the breather chamber 16 side (right side in the drawing).

As shown in FIG. 27, the parking pawl 31 is supported by the plate member 8 with the holder 34 interposed.

As shown in FIG. 28, the parking pawl 31 is an integral component having a first plate-shaped part 310 that has a through hole 310d, and a second plate-shaped part 311 that has a hook part 311c.

The projection 341 of the holder 34 side is inserted in the insertion hole 310d of the parking pawl 31. The parking pawl 31 is supported to be rotatable on the projection 341, and is rotatable around an axis line X2 parallel to the rotation axis X.

As shown in FIG. 28, the first plate-shaped part 310 seen from the rotation axis X direction extends along a straight line Lx1 orthogonal to the axis line X2 to the upward side from the region in which the projection 341 is supported.

The first plate-shaped part 310, after extending to a position of approximately the same height as the supporting boss 86 of the plate member 8, bends in the direction separating from the breather chamber 16 (leftward in the drawing).

In the first plate-shaped part 310, a region beyond a bend 310e extends along a straight line Lx2, and the tip side of this region is an operated part 310c operated by a cam 320 of the parking rod 32.

The operated part 310c is placed on the cam 320 supported by the support 33. The support 33 functions as a support unit for the parking rod 32. The support 33 is supported so that the parking rod 32 can move forward and back (slide).

As shown in FIG. 28, seen from the rotation axis X direction, the hook part 311c that is the engaging part with the parking gear 30 is provided on the bottom of the second plate-shaped part 311.

The hook part 311c is formed bulging from the bottom part of the second plate-shaped part 311 to the rotation axis X side. The hook part 311c has a tapered shape for which the width Wp (see FIG. 29) becomes narrower as it approaches the rotation axis X.

As shown in FIG. 30, with the first plate-shaped part 310 of the parking pawl 31, a locking hole 310f is provided at the side of the insertion hole 310d. One end of a spring Sp is engaged in the locking hole 310f (see FIG. 28). The other end of the spring Sp is press fitted on the outer circumference edge 80c of the plate member 8. The spring Sp is externally fitted on the support pin 85b of the plate member 8. In this state, the spring Sp has an energizing force act on the parking pawl 31. By the energizing force that acts from the spring Sp, the parking pawl 31 is always energized in the direction in which the hook park 311c is separated from the parking gear 30 (counterclockwise direction in FIG. 28: see arrow).

As described above, the parking pawl 31 can rotate around the axis line X2 parallel to the rotation axis X.

As shown in FIG. 3, the first plate-shaped part 310 of the parking pawl 31 is arranged between the holder 34 and the plate member 8 in the rotation axis X direction. The second plate-shaped part 311 is positioned at the motor 2 side (right side in the drawing) from the first plate-shaped part 310, and has the inner diameter side of the holder 34 extending downward.

As shown in FIG. 31, the first plate-shaped part 310 and the second plate-shaped part 311 are offset in the axis line X2 direction parallel to the rotation axis X.

A step part 312 that connects surfaces 310a, 311a of the holder 34 side to each other and a step part 313 that connects surface 310b, 311b of the plate member 8 side to each other are provided at the boundary of the first plate-shaped part 310 and the second plate-shaped part 311.

The surface 310a of the holder 34 side of the first plate-shaped part 310 and the surface 311a of the holder 34 side of the second plate-shaped part 311 are parallel to each other.

The surface 310b of the plate member 8 side of the first plate-shaped part 310 and the surface 311b of the plate member 8 side of the second plate-shaped part 311 are parallel to each other.

The step part 312 and the step part 313 are respectively inclined with respect to a straight line Ly along the surface 310b of the plate member 8 side of the first plate-shaped part 310 seen from the radial direction of the axis line X2.

The angle θ2 formed by the straight line Ly and the step part 312 is greater than the angle θ3 formed by the straight line Ly and the step part 313.

As shown in FIG. 31, in the present embodiment, the angle θ2 between the straight line Ly and the step part 312 is an angle by which interference with the holder 34 can be avoided.

Furthermore, in the present embodiment, the step part 313 is provided not only on the holder 34 side but also on the side opposite from the holder 34 (holder member 8 side). As a result, the thickness in the axis line X2 direction of the first plate-shaped part 310 and the second plate-shaped part 311 is the same.

As shown in FIG. 28, the parking rod 32 seen from the rotation axis X direction is provided facing along a straight line Lx3 that passes above the horizontal line HL. The parking rod 32 is orthogonal to the rotation axis X.

In the parking rod 32, the tip side on which the cam 320 is externally fitted is provided facing the parking pawl 31 side (breather chamber 16 side), and the cam 320 is inserted between the support 33 and the operated part 310c of the parking pawl 31.

As shown in FIG. 33, in the cross section view, the support 33 has an arc-shaped bottom wall part 331, side wall parts 332, 333 extending upward from both sides of the bottom wall part 331, and a connecting piece 334 extending downward from the bottom wall part 331.

The support 33 is fixed to the attachment part 89 of the plate member 8 by the bolt B penetrating the connecting piece 334.

As shown in FIG. 33, the support 33 in the interior of the power transmission device 1 is fixed to the plate member 8 in a state with one side wall part 333 in contact with the wall part 120 of the second box 12. Also, in the support 33, the other side wall part 332 is provided with a gap open with the plate member 8.

In the support 33, the portion constituted from the bottom wall part 331 and the side wall parts 332, 333 at both sides of the bottom wall part 331 forms approximately a U shape in the cross section view. The support 33 is provided with the opening of the approximately U-shaped portion facing upward.

As shown in FIG. 34, in the support 33, a cam part 335 is provided on the inner circumference of the breather chamber 16 side (right side in the drawing). A top surface 335a of the cam part 335 is positioned above a top surface 331a of the bottom wall part 331.

In the parking rod 32, the cam 320 is externally fitted on a tip 32a side. The cam 320 is energized to the tip 32a side by the energization force of a spring (not illustrated).

When the parking rod 32 is displaced in the direction pushing the cam 320 between the support 33 and the operated part 310c of the parking pawl 31 (rightward in FIG. 34), the cam 320 riding on the cam part 335 pushes the operated part 310c up.

Figure 37:
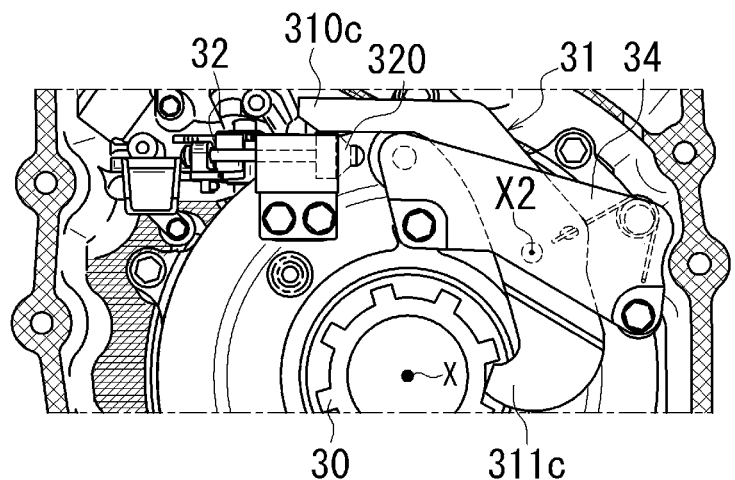
FIG. 37 is a drawing for explaining the operation of the park lock mechanism.

As a result, the parking pawl 31 rotates in the clockwise direction in FIG. 28, and is arranged at a position in which the hook part 311c engages with the outer circumference of the parking gear 30 (engagement position: see FIG. 37).

When the parking rod 32 is displaced in the direction pulling out from between the support 33 and the operated part 310c of the parking pawl 31 (leftward in the FIG. 34), the cam 320 of the parking rod 32 descends from the cam part 335 and reaches the top surface 331a of the bottom wall part 331 (see virtual lines in FIG. 34).

Figure 35:
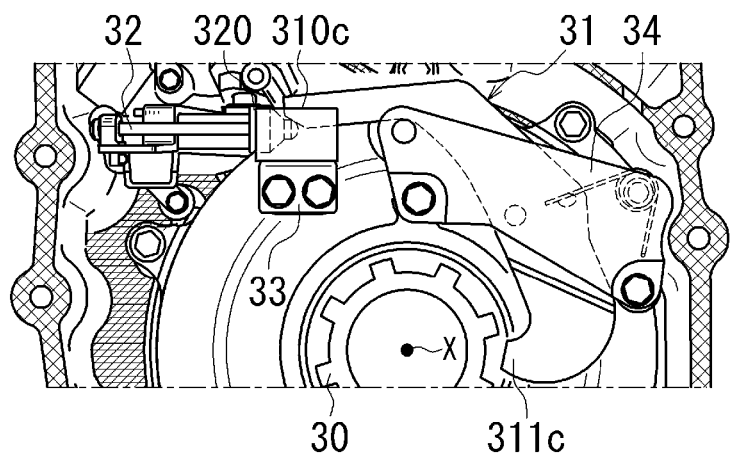
FIG. 35 is a drawing for explaining the operation of the park lock mechanism.

As a result, the parking pawl 31 rotates in the counter-clockwise direction in FIG. 28 by the energization force of the spring Sp, and is arranged at a position in which the hook part 311c is detached from the outer circumference of the parking gear 30 (detachment position) (see FIG. 35).

The parking pawl 31 of the present embodiment is a parking pawl of a type one lever format with the rotation axis that becomes the fulcrum point (axis line X2) positioned between the operated part 310c which is the leverage point and the hook part 311c which is the action point.

This is different from a parking pawl of a type two lever format in which the action point is placed at the center, and the leverage point and the fulcrum point are positioned outside the action point (one side and the other side seen from the action point), or a type three lever format in which the fulcrum point is arranged outside the leverage point and the action point, and at a location near the leverage point.

The parking pawl 31 of the type one lever format rotates around the axis line X2 by the operating force (force) of the parking rod 32 acting on the operated part 310c which is the leverage point. Then, by rotation of this parking pawl 31, the hook part 311c positioned at the action point side moves to the engagement position at which it engages with the parking gear 30.

As shown in FIG. 32, another end 32b of the parking rod 32 is supported by a linking part 355 of the manual plate 35. In this state, the parking rod 32 is provided to be able to be displaced in the axial direction in a state with falling off from the linking part 355 prevented.

The manual plate 35 has a base 351 externally fitted on the manual shaft 37, and an arm part 353 and an engaging part 352 extending in the radial direction of the rotation axis Y of the manual shaft 37.

The base 351 is fixed to the manual shaft 37 in a state with relative rotation with the manual shaft 37 regulated.

The arm part 353 extends in the direction approaching the motor 2 from the outer circumference of the base 351. Seen from the rotation axis X radial direction, the arm part 353 crosses the outer diameter side of the plate member 8 at the motor 2 side.

As shown in FIG. 27, the tip side of the arm part 353, after bending to the lower (rotation axis) side, connects to a support unit 354 for which the linking part 355 is fixed to the top part.

Also, as shown in FIG. 32, there is a wide formation with a prescribed range in the circumferential direction of the rotation axis Y at the tip side of the engaging part 352 extending from the base 351. A plurality of recesses continuous in the circumferential direction are provided on the outer circumference of the region formed to be wide. A roller 365 of the detent spring 36 engages elastically with one of this plurality of recesses (see FIG. 27).

In the detent spring 36, a base end part 361 of the lengthwise direction is fixed to the fourth box 14 by the bolt B. The tip side at which the roller 365 is provided can be elastically displaced in the radial direction of the base 351 of the manual plate 35. Also, the tip side at which the roller 365 is provided is press fitted on the outer circumference (recess) of the base 351 of the manual plate 35.

In the present embodiment, in conjunction with switching between the driving mode and parking mode of a vehicle in which the power transmission device 1 is mounted, the manual shaft 37 rotates around the rotation axis Y.

When the manual shaft 37 rotates, the manual plate 35 fixed to the manual shaft 37 also rotates around the rotation axis Y. Having done that, the arm part 353 extending from the base 351 of the manual plate 35 and the linking part 355 fixed to the support unit 354 of the tip of the arm part 353 are displaced in the circumferential direction around the rotation axis Y. The parking rod 32 linked to the linking part 355 is also displaced in the lengthwise direction of the parking rod 32.

From FIG. 35 to FIG. 38 are drawings for explaining the operation of the park lock mechanism 3.

FIG. 35 is a drawing for explaining the arrangement of the parking pawl 31 and the parking rod 32 when a vehicle in which the power transmission device 1 is mounted is in the driving mode.

Figure 36:
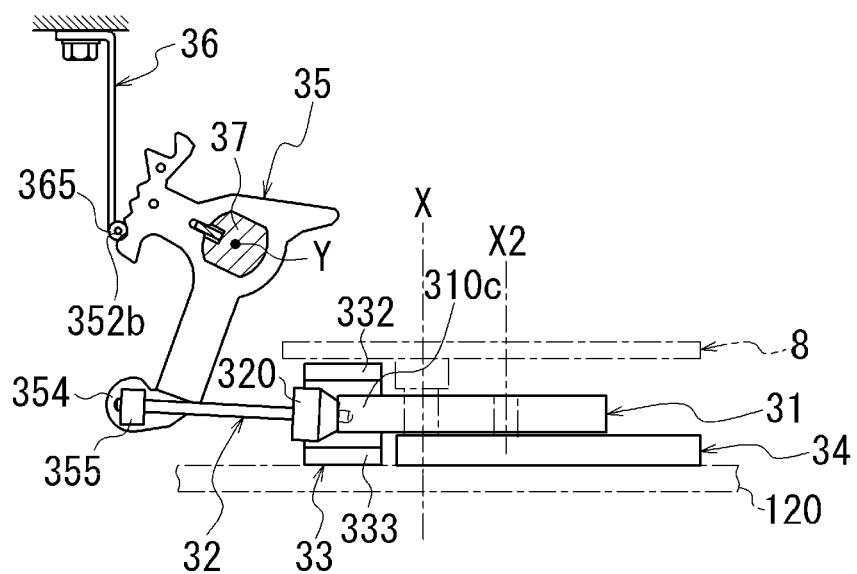
FIG. 36 is a drawing for explaining the operation of the park lock mechanism.

FIG. 36 is a drawing for explaining the arrangement of the parking rod 32 and the manual plate 35 when the vehicle in which the power transmission device 1 is mounted is in the driving mode.

FIG. 37 is a drawing for explaining the arrangement of the parking pawl 31 when the vehicle in which the power transmission device 1 is mounted is in the parking mode.

Figure 38:
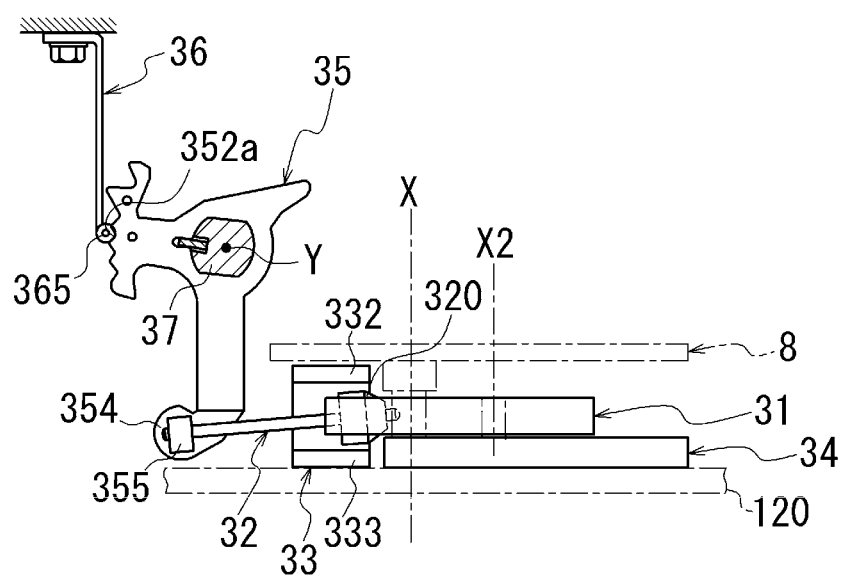
FIG. 38 is a drawing for explaining the operation of the park lock mechanism.

FIG. 38 is a drawing for explaining the arrangement of the parking rod 32 and the manual plate 35 when the vehicle in which the power transmission device 1 is mounted is in the parking mode.

When the vehicle in which the power transmission device 1 is mounted is in the driving mode, the manual shaft 37 is arranged at an angle position in which the roller 365 of the detent spring 36 is engaged with a recess 352b of the manual plate 35 (see FIG. 36).

In this state, the cam 320 of the parking rod 32 is arranged at a position in which it is pulled out from between the support 33 and the operated part 310c of the parking pawl 31.

In this state, the parking pawl 31 is arranged at a position in which the hook part 311c is separated from the parking gear 30 (see FIG. 35).

For that reason, the motor shaft 20 to which the parking gear 30 is attached is in a state for which rotation around the rotation axis X is allowed, resulting in a state in which the output rotation of the motor 2 can be transmitted to the drive wheels W, W, specifically, a state in which the vehicle in which the power transmission device 1 is mounted can drive.

In the vehicle in which the power transmission device 1 is mounted, when switched from the driving mode to the parking mode, the manual plate 35 rotates from the angle position shown in FIG. 36 to the angle position shown in FIG. 38.

Having done that, the manual shaft 37 is arranged at an angle position in which the roller 365 of the detent spring 36 is engaged with the recess 352a of the manual plate 35 (see FIG. 38).

In this state, the cam 320 of the parking rod 32 is arranged at a position in which it is inserted between the support 33 and the operated part 310c of the parking pawl 31.

In this state, the parking pawl 31 is arranged at a position in which the hook part 311c is engaged with the parking gear 30 (see FIG. 37).

For that reason, the motor shaft 20 to which the parking gear 30 is attached has rotation around the rotation axis X regulated. This results in a state in which transmission of the output rotation of the motor 2 to the drive wheels W, W is not possible. Specifically, the vehicle in which the power transmission device 1 is mounted is in a state in which driving is not possible (parking state).

As shown in FIG. 36, the parking pawl 31 of the park lock mechanism 3, the parking rod 32, the support 33, and the holder 34 are positioned at the wall part 120 side (motor 2 side) of the second box 12 seen from the plate member 8.

The manual plate 35, the detent spring 36, and the manual shaft 37 are positioned at the side opposite to the wall part 120 of the second box 12 (differential case 50, planetary reduction gear 4 side) when seen from the plate member 8.

Specifically, in FIG. 24, the parking pawl 31, the parking rod 32, the support 33, and the holder 34 are arranged at the surface 80a side of the motor 2 side of the plate member 8. Also, the manual shaft 37 and a detent mechanism (manual plate 35, detent spring 36) are arranged at a surface 80b side of the differential case 50 side of the plate member 8.

The constituent components of the park lock mechanism 3 are distributed and arranged using the space of the motor 2 side and the space of the differential case 50 side with the plate member 8 sandwiched between. For that reason, it is possible to arrange the constituent components of the park lock mechanism 3 while effectively utilizing space with room to spare inside the fourth box 14. Thus, when arranging the park lock mechanism 3 inside the body box 10, it is possible to suppress enlargement of the body box 10.

The parking pawl 31 of the park lock mechanism 3 is attached to the plate member 8 with the holder 34 interposed. The support 33 on which the cam 320 of the parking rod 32 is placed is attached to the plate member 8.

The plate member 8 is a fixing side member fixed to the fourth box 14 using the bolt B. Thus, it is possible to suitably arrange the constituent components of the park lock mechanism 3 using the plate member 8.

Also, the manual plate 35, the detent spring 36, and the manual shaft 37 are arranged using the space of the oil catch unit 15 formed on the top part of the fourth box 14 in the vertical line VL direction. As a result, it is possible to arrange the constituent components of the park lock mechanism 3 using the space of the oil catch unit 15 which has room to spare inside the fourth box 14 without making the fourth box 14 larger.

The operation of the power transmission device 1 of this configuration is explained.

As shown in FIG. 1, in the power transmission device 1, the planetary reduction gear 4, the differential device 5, and the drive shafts 9 (9A, 9B) are provided along the transmission route of the output rotation of the motor 2.

Also, the parking gear 30 of the park lock mechanism 3 is provided between the motor 2 and the planetary reduction gear 4 in the power transmission route.

When the vehicle in which the power transmission device 1 is mounted is in parking mode, the parking pawl 31 is arranged at a position at which the hook part 311c is engaged with the parking gear 30 (see FIG. 37). For that reason, the motor shaft 20 to which the parking gear 30 is attached is in a state for which the rotation around the rotation axis X is regulated.

In this state, the rotation of the drive wheels W, W is regulated, and the vehicle in which the power transmission device 1 is mounted is in the parking state.

When the mode of the vehicle in which the power transmission device 1 is mounted is switched from parking mode to driving mode, the manual shaft 37 rotates around the rotation axis Y by the drive power of an actuator motor (not illustrated).

As a result, the manual shaft 37 is displaced from the angle position (see FIG. 38) in which the roller 365 of the detent spring 36 is engaged with the recess 352a of the manual plate 35 to the angle position (see FIG. 36) in which it is engaged with the recess 352b.

Having done that, by the rotation of the manual plate 35 around the rotation axis Y, the parking rod 32 is displaced in the direction of pulling the cam 320 out from between the support 33 and the operated part 310c of the parking pawl 31 (leftward in FIG. 38).

Having done that, at the point when the cam 320 is pulled out from between the support 33 and the operated part 310c of the parking pawl 31, the parking pawl 31 rotates around the axis line X1 by the energizing force of the spring Sp, and the hook part 311c is detached from the outer circumference of the parking gear 30 (see FIG. 35).

Having done that, the motor shaft 20 to which the parking gear 30 is attached is in a state for which rotation around the rotation axis X is allowed.

In this state, rotation of the drive wheels W, W is allowed, and the vehicle in which the power transmission device 1 is mounted is in state for which driving is possible.

As shown in FIG. 2, in this state, when the motor 2 is driven and the rotor core 21 rotates around the rotation axis X, the rotation is inputted to the sun gear 41 of the planetary reduction gear 4 via the motor shaft 20 that rotates integrally with the rotor core 21.

As shown in FIG. 3, with the planetary reduction gear 4, the sun gear 41 serves as the input unit of the output rotation of the motor 2. The differential case 50 that supports the stepped pinion gear 43 serves as the output unit of the inputted rotation.

When the sun gear 41 rotates around the rotation axis X by the inputted rotation, the stepped pinion gear 43 (large diameter gear part 431, small diameter gear part 432) rotates around the axis line X1 by the rotation inputted from the sun gear 41 side.

Here, the small diameter gear part 432 of the stepped pinion gear 43 is engaged with the ring gear 42 fixed to the inner circumference of the fourth box 14. For that reason, the stepped pinion gear 43 revolves around the rotation axis X while auto-rotating around the axis line X1.

Here, with the stepped pinion gear 43, the outer diameter R2 of the small diameter gear part 432 is smaller than the outer diameter R1 of the large diameter gear part 431 (see FIG. 3).

As a result, the differential case 50 (first case unit 6, second case unit 7) that supports the stepped pinion gear 43 rotates around the rotation axis X at a rotation speed lower than the rotation inputted from the motor 2 side.

For that reason, the rotation inputted to the sun gear 41 of the planetary reduction gear 4 is significantly reduced by the stepped pinion gear 43. The reduced rotation is outputted to the differential case 50 (differential mechanism 5).

By the differential case 50 rotating around the rotation axis X by the inputted rotation, inside the differential case 50, the drive shafts 9 (9A, 9B) that engage with the pinion mate gear 52 rotate around the rotation axis X. As a result, drive wheels W, W (see FIG. 1) at the left and right of the vehicle in which the power transmission device 1 is mounted rotate by the transmitted rotational drive power.

As shown in FIG. 2, the oil OL for lubrication is retained inside the fourth box 14. For that reason, the retained oil OL is scooped up by the differential case 50 rotating around the rotation axis X during transmission of the output rotation of the motor 2.

The engagement part between the sun gear 41 and the large diameter gear part 431, the engagement part between the small diameter gear part 432 and the ring gear 42, and the engagement part between the pinion mate gear 52 and the side gears 54A, 54B are lubricated by the scooped-up oil OL.

As shown in FIG. 19, the differential case 50 seen from the third box 13 side rotates in the counterclockwise direction CCW around the rotation axis X.

The oil catch unit 15 is provided on the top part of the fourth box 14. The oil catch unit 15 is positioned at the downstream side in the rotation direction of the differential case 50. Much of the oil OL scooped up by the differential case 50 flows into the oil catch unit 15.

As shown in FIG. 22, the oil guide 152 mounted on the support stand 151 is provided in the oil catch unit 15.

The guide unit 154 and the catch unit 153 of the oil guide 152 are positioned at the radial outside of the first case unit 6 of the differential case 50 and the radial outside of the second case unit 7 of the differential case 50.

For that reason, much of the oil that is scooped up by the differential case 50 and flows into the oil catch unit 15 is captured by the oil guide 152.

A portion of the oil OL captured by the oil guide 152 is discharged from the notch part 155 provided in the wall part 153a, and flows into the oil hole 151a for which one end is opened on the top surface of the support stand 151.

The end part of the inner diameter side of the oil hole 151a is open at the inner circumference of the support unit 145 (see FIG. 2). For that reason, the oil OL that flows into the oil hole 151a is discharged to a gap Rx between the inner circumference of the support unit 145 of the fourth box 14 and the cylinder wall part 540 of the side gear 54B.

A portion of the oil OL discharged to the gap Rx lubricates the bearing B2 supported by the support unit 145. The oil OL that lubricates the bearing B2 moves to the outer diameter side by the centrifugal force by rotation of the differential case 50. On the outer diameter side of the differential case 50, the slit 710 is provided along the inner circumference of the peripheral wall part 73. Further movement of the oil OL to the outer diameter side is obstructed by the peripheral wall part 73. The oil OL passes through the slit 710 to the first case unit 6 side.

At the first case unit 6 side of the slit 710, the case-internal oil passage 781 is open in the inner circumference of the guide unit 78. A portion of the oil OL that passes through the slit 710 flows inside the case-internal oil passage 781 by the centrifugal force by the rotation of the differential case 50.

The oil OL that flows into the case-internal oil passage 781 passes through the introduction path 441 and flows into the shaft-internal oil passage 440 of the pinion shaft 44. The oil OL that flows into the shaft-internal oil passage 440 is discharged radially outside from the oil holes 442, 443. The discharged oil OL lubricates the needle bearing NB externally fitted on the pinion shaft 44.

Furthermore, a portion of the oil OL discharged to the gap Rx passes through the oil groove 721 provided on the inner circumference of the cylinder wall part 72 of the second case unit 7 as shown in FIG. 14. The oil OL that passes through the oil groove 721 is supplied to the washer 55 that supports the back surface of the side gear 54B and lubricates the washer 55.

Furthermore, the oil OL passes through the oil groove 712 provided in the base 71 of the second case unit 7 and the oil groove 742 provided in the arc part 741. The oil OL that passes through the oil groove 742 is supplied to the spherical washer 53 that supports the back surface of the pinion mate gear 52 and lubricates the spherical washer 53.

Also, a portion of the oil OL captured by the oil guide 152 of the oil catch unit 15 is discharged to the guide unit 154 side (see FIG. 20). The tip 154b of the guide unit 154 faces the oil hole 126a provided in the wall part 120 of the second box 12 with a gap open in the rotation axis X direction (see FIG. 21).

For that reason, much of the oil OL discharged to the guide unit 154 side flows into the oil hole 126a of the second box 12.

The oil OL that did not flow into the oil hole 126a goes along the wall part 120 of the second box 12 and moves toward the bottom of the fourth box 14.

As shown in FIG. 2, in the fourth box 14, between the wall part 120 and the plate member 8 is the second gear chamber Sb2. The parking gear 30 of the park lock mechanism 3 is positioned in the second gear chamber Sb2.

For that reason, the oil OL that did not flow into the oil hole 126a lubricates the parking gear 30 when it moves toward the bottom inside the second chamber Sb2.

As shown in FIG. 21, the boss part 126 surrounding the oil hole 126a is provided on the outer circumference of the wall part 120. One end of the pipe 127 is fitted into the boss part 126 from the rotation axis X direction.

For that reason, the oil OL that flows into the oil hole 126a of the second box 12 flows inside the pipe 127.

The pipe 127 passes through the outside of the second box 12 and extends to the third box 13. The other end of the pipe 127 communicates with the oil hole 136a provided in the cylindrical connecting wall 136 of the third box 13 (see FIG. 2).

For that reason, in the present embodiment, a portion of the oil OL that reaches the oil catch unit 15 passes through the guide unit 154 and the pipe 127 and is supplied to the internal space Sc of the connecting wall 136.

The oil OL discharged from the oil hole 136a to the internal space Sc is retained in the internal space Sc. The oil OL lubricates the bearing B4 supported by the peripheral wall part 131 of the third box 13.

A portion of the oil OL discharged to the internal space Sc passes through the gap between the outer circumference of the drive shaft 9A and the inner circumference of the motor shaft 20, and moves to the other end 20b side of the motor shaft 20.

As shown in FIG. 10, the other end 20b of the motor shaft 20 is inserted inside the cylinder wall part 541 of the side gear 54A. A connection path 542 that communicates with the back surface of the side gear 54A is provided on the inner circumference of the cylinder wall part 541.

For that reason, a portion of the oil OL that moves to the other end 20b side of the motor shaft 20 and is discharged to inside the cylinder wall part 541 passes through the connection path 542. The oil OL that passes through the connection path 542 is supplied to the washer 55 of the back surface of the side gear 54A and lubricates the washer 55.

Furthermore, the oil OL that lubricates the washer 55 of the back surface of the side gear 54A passes through the oil groove 662 provided on the gear support part 66 of the first case unit 6 and the oil groove 642 provided on the arc part 641. The oil OL that passes through the oil groove 642 is supplied to the spherical washer 53 that supports the back surface of the pinion mate gear 52 and lubricates the spherical washer 53.

Also, as shown in FIG. 2, the internal space Sc of the third box 13 connects with the second gear chamber Sb2 provided in the fourth box 14 via the radial oil passage 137, the axial oil passage 138, the communication hole 112a, and the oil reservoir 128 provided at the bottom of the second box 12.

For that reason, the oil OL inside the internal space Sc is held at a position at the same height at which the oil OL is retained inside the fourth box 14.

In this way, much of the oil OL scooped up by the differential case 50 rotating around the rotation axis X flows into the oil catch unit 15. The oil OL is supplied from the oil catch unit 15 to inside the support unit 145 of the fourth box 14 and lubricates the bearing B2. The oil OL is also supplied from the oil catch unit 15 to the internal space Sc inside the third box 13 and lubricates the bearing B4. Also, the oil OL that lubricates these bearings B2, B4 is ultimately returned to inside the fourth box 14, and scooped up by the rotating differential case 50.

Furthermore, a portion of the oil OL captured by the oil catch unit 15 is returned to inside the second gear chamber Sb2, and the parking gear 30 inside the second gear chamber Sb2 is lubricated.

Thus, in the power transmission device 1, the oil OL inside the fourth box 14 is scooped up during rotation of the drive wheels W, W, and is used for lubrication of the bearings, the parking gear, and engagement parts between gears with each other. The oil OL used for lubrication is returned to inside the fourth box 14 and made to be able to be scooped up again.

As described above, the power transmission device 1 of the present embodiment has the following configuration.
  (1) The power transmission device 1 comprises
    the bearing B3 (bearing),
    the differential mechanism 5,
    the differential case 50 (case) that houses the differential mechanism 5,
    the stepped pinion gear 43 (pinion gear) supported by the differential case 50,
    the wall part 120 that overlaps the differential case 50 in the rotation axis X direction (axial direction),
    the plate member 8 (plate) that is provided between the wall part 120 and the differential case 50 in the rotation axis X direction, and that supports the differential case 50 with the bearing B3 interposed, and
    the parking pawl 31 that is fixed to be able to rotate on the plate member 8 in a position that overlaps the plate member 8 in the rotation axis X direction.

By configuring in this way, by having the parking pawl 31 supported by the plate member 8 for supporting the bearing B3, it is possible to arrange the parking rod 32 at the position that overlaps the plate member 8 in the rotation axis X direction.

As a result, seen from the rotation axis X direction, the parking rod 32 and the plate member 8 are provided in an overlapping positional relationship. Thus, by setting the movement range of the parking rod 32 when operating the parking pawl 31 to be within the size range of the plate member 8 when seen from the rotation axis X direction, it is not necessary to make the body box 10 larger in the radial direction to provide the park lock mechanism 3. Thus, it is possible to downsize the power transmission device 1 in the radial direction.

The power transmission device 1 has the following configuration.
  (2) The power transmission device 1 has
    the parking rod 32, and
    the support 33 (parking rod support part) that supports the parking rod 32 to be able to move forward and backward (slide).
    The support 33 is fixed to the plate member 8 at a position that overlaps the plate member 8 in the rotation axis X direction.

By configuring in this way, seen from the rotation axis X direction, the support 33 and the plate member 8 are provided in an overlapping positional relationship, so it is possible to downsize the power transmission device 1 in the radial direction.

The power transmission device 1 has the following configuration.
  (3) The power transmission device 1 has the spring Sp that has energizing force act on the parking pawl 31 in the direction that separates the hook part 311c from the parking gear 30.
    The spring Sp has one end locked in the locking hole 310f of the parking pawl 31, and the other end fixed to the outer circumference edge 80c of the plate member 8.

By configuring in this way, seen from the rotation axis X direction, it is possible to provide the spring Sp without projecting to the outer diameter side from the outer circumference edge 80c of the plate member 8, so it is possible to downsize the power transmission device 1 in the radial direction.

The power transmission device 1 has the following configuration.
  (4) The power transmission device 1 has the spring Sp that has energizing force act on the parking pawl 31 in the direction that separates the hook part 311c from the parking gear 30.
    The spring Sp has one end locked to the locking hole 310f of the parking pawl 31, and the other end fixed to the outer edge 80c of the plate member 8.
    The parking pawl 31 has a portion that is positioned between the spring Sp and the support 33 (parking rod support part) in the direction intersecting the rotation axis X direction (see FIG. 28).

By configuring in this way, it is possible to make the park lock mechanism 3 be compact.

The power transmission device 1 has the following configuration.
  (5) The plate member 8 is fixed to the fourth box 14 by a fixing member.

The density of the constituent material of the plate member 8 is greater than the density of the constituent material of the fourth box 14.

The body box 10 of the power transmission device 1 is often formed from a material with a low density (specific gravity) using aluminum or magnesium as the main component (e.g. an aluminum alloy or magnesium alloy) to reduce weight.

A large force is applied to the parking pawl 31 during operation of the park lock mechanism 3. For that reason, if the plate member 8 that supports the parking pawl 31 is formed using the same constituent material as the body box 10 or the fourth box 14, to increase the strength, it is necessary to increase the thickness of the plate member 8, which hinders downsizing in the rotation axis X direction.

In light of that, by configuring as described above, by forming the plate member 8 using a material having a large density with iron, etc., as the main component (e.g. cast iron), it is possible to make the thickness of the plate member 8 thinner. Thus, it is possible to downsize the power transmission device 1 in the rotation axis X direction.

The constituent material of the plate member 8 and the body box 10 (fixing member) is not limited to only the items noted above. Since a variety of components are attached to the plate member 8, the shape of the plate member 8 becomes complex. For that reason, for the plate member 8, it is suitable to use a cast iron plate that can be formed by casting and which is a material with high density.

The power transmission device 1 has the following configuration.

(6) The motor 2 is arranged upstream of the differential mechanism 5 on the transmission route of the rotational drive power in the power transmission device 1.

The differential mechanism 5 overlaps the motor 2 in the rotation axis X direction, and the differential mechanism 5 is provided in a positional relationship overlapping the motor 2 when seen from the rotation axis X direction.

The power transmission device 1 is the power transmission device 1 for a single axle electric vehicle, and can provide a compact power transmission device.

The power transmission device 1 has the following configuration.

(7) The support 33 and the parking gear 30 overlap in the radial direction of the rotation axis X, and when seen from the radial direction of the rotation axis X, the support 33 and the parking gear 30 are provided in an overlapping positional relationship.

The parking pawl 31 has the first plate-shaped part 310 supported to be able to rotate between the support 33 and the plate member 8 in the rotation axis X direction, and the second plate-shaped part 311 having the hook part 311*c*.

The first plate-shaped part 310 and the second plate-shaped part 311 are offset in the rotation axis X direction, and the second plate-shaped part 311 is provided in a positional relationship overlapping the support 33 and the parking gear 30 when seen from the radial direction of the rotation axis X.

The step part 312 by which interference with the support 33 is avoided is provided at the boundary of the first plate-shaped part 310 and the second plate-shaped part 311.

When the step part 312 is not provided in the parking pawl 31, it is necessary to widen the gap between the support 33 and the plate member 8 in the rotation axis X direction to detach the hook part 311*c* of the parking pawl 31 with the parking gear 30.

By providing the step part 312 in the parking pawl 31, it is not necessary to widen the gap between the support 33 and the plate member 8 in the rotation axis X direction. Thus, making the power transmission device 1 larger in the rotation axis X direction can be suitably prevented.

The power transmission device 1 has the following configuration.

(8) The ring-shaped support unit 801 that surrounds the center through hole 800 is provided on the plate member 8.

In the parking pawl 31, the step part 313 by which interference with the support unit 801 is avoided is provided at the boundary of the first plate-shaped part 310 and the second plate-shaped part 311.

Seen from the radial direction of the rotation axis X, the thickness in the rotation axis X direction of the first plate-shaped part 310 and the second plate-shaped part 311 is approximately the same.

By configuring in this way, since the thickness of the first plate-shaped part 310 side and the second plate-shaped part 311 side is approximately the same, it is possible to ensure rigidity strength of the parking pawl 31.

By providing the step parts 312, 313 at the motor 2 side and the plate member 8 side in the rotation axis X direction, it is possible to arrange the parking pawl 31 while utilizing the gap in the rotation axis direction between the plate member 8 and the holder 34.

In the embodiments described above, an example was shown of the parking pawl 31 being provided at the surface 80*a* side of the motor 2 side in the plate member 8. In the plate member 8, the parking pawl 31 may also be provided in the differential case 50 or the stepped pinion gear 43 side surface 80*b*. In the embodiments described above, an example was shown with the parking rod 32 moving forward and backward in the direction intersecting the rotation axis X direction (straight line Lx3: see FIG. 28), but the present application is not limited only to this mode.

The parking rod 32 may also be made to move forward and backward in the rotation axis X direction to operate the operated part 310*c* of the parking pawl 31.

Furthermore, in the embodiments described above, an example was shown in which seen from the plate member 8, the motor 2 is arranged at the back side (right side in FIG. 2) of the wall part 120 of the second box 12.

The motor 2 may also be arranged at the front side (left side in FIG. 2) of the wall part 120 of the second box 12.

Above, embodiments of the invention of the present application were explained, but the invention of the present application is not limited only to the modes shown in the embodiments. It can be modified as appropriate within the scope of the technical concepts of the invention.

EXPLANATION OF CODES

1: Power transmission device; 2: Motor; 30: Parking gear; 31: Parking pawl; 310: First plate-shaped part; 310*f*: Locking hole; 311: Second plate-shaped part; 311*c*: Hook part; 313: Step part; 32: Parking rod; 33: Support (parking rod support part); 43: Stepped pinion gear (pinion gear); 5: Differential mechanism; 50: Differential case (case); 8: Plate member (plate); 80*c*: Outer circumference edge; 800: Through hole; 801: Support unit; 14: Fourth box (fixing member); B3: Bearing (bearing); Sp: Spring; and X: Rotation axis.

The invention claimed is:

1. A power transmission device comprising:
a bearing;
a differential mechanism;
a case that houses the differential mechanism;
a pinion gear supported by the case;
a wall part that overlaps the case in an axial direction;
a plate that is provided between the wall part and the case in the axial direction, and that supports the case with the bearing being interposed, and
a parking pawl that is rotatably fixed to the plate in a position that overlaps the plate in the axial direction.

2. The power transmission device according to claim 1, further comprising
a parking rod, and
a parking rod support part that supports the parking rod to be slidable, wherein
the parking rod support part is fixed to the plate at a position overlapping the plate in the axial direction.

3. The power transmission device according to claim 2, further comprising
a spring that acts on the parking pawl, wherein
the spring is fixed to the plate.

4. The power transmission device according to claim 3, wherein
the parking pawl has a portion positioned between the spring and the parking rod support part in a direction intersecting the axial direction.

5. The power transmission device according to claim 4, wherein
the plate is fixed to a fixing member, and
a density of the plate is greater than a density of the fixing member.

6. The power transmission device according to claim 5, further comprising
a motor arranged upstream of the differential mechanism, wherein
the differential mechanism overlaps the motor in the axial direction.

7. The power transmission device according to claim 6, further comprising
a parking gear that engages with the parking pawl, the parking gear being arranged between the plate and the wall part in the axial direction.

8. The power transmission device according to claim 1, further comprising
a spring that acts on the parking pawl, wherein
the spring is fixed to the plate.

9. The power transmission device according to claim 1, wherein
the plate is fixed to a fixing member, and
a density of the plate is greater than a density of the fixing member.

10. The power transmission device according to claim 1, further comprising
a motor arranged upstream of the differential mechanism, wherein
the differential mechanism overlaps the motor in the axial direction.

11. The power transmission device according to claim 1, further comprising
a parking gear that engages with the parking pawl, the parking gear being arranged between the plate and the wall part in the axial direction.

* * * * *